US007134956B2

(12) United States Patent
Lee

(10) Patent No.: US 7,134,956 B2
(45) Date of Patent: Nov. 14, 2006

(54) AUTOMATED FEET-GRIPPING SYSTEM

(75) Inventor: Kok-Meng Lee, Norcross, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/618,523

(22) Filed: Jul. 11, 2003

(65) Prior Publication Data

US 2004/0067725 A1 Apr. 8, 2004

Related U.S. Application Data

(63) Continuation-in-part of application No. 09/748,656, filed on Dec. 22, 2000, now Pat. No. 6,623,346.

(60) Provisional application No. 60/171,990, filed on Dec. 23, 1999, provisional application No. 60/177,576, filed on Jan. 22, 2000, provisional application No. 60/197,362, filed on Apr. 15, 2000, provisional application No. 60/252,987, filed on Nov. 23, 2000.

(51) Int. Cl.
    *A22B 1/00* (2006.01)
(52) U.S. Cl. ........................ 452/53; 452/179
(58) Field of Classification Search ............. 452/52, 452/53, 54, 55, 56, 163, 166, 167, 177, 178, 452/179, 180, 181, 183, 184, 187, 188, 194
    See application file for complete search history.

(56) References Cited

U.S. PATENT DOCUMENTS

| | | | | |
|---|---|---|---|---|
| 2,739,347 A | * | 3/1956 | Sharp et al. | 452/183 |
| 2,952,032 A | | 9/1960 | Breitkreutz | 452/53 |
| 3,106,744 A | * | 10/1963 | Gillman | 452/53 |
| 3,571,844 A | * | 3/1971 | Stiles | 452/183 |
| 3,622,000 A | | 11/1971 | McClenny | 209/121 |
| 3,774,264 A | | 11/1973 | Anderson et al. | 452/134 |

(Continued)

FOREIGN PATENT DOCUMENTS

EP 0533288 * 3/1993

(Continued)

OTHER PUBLICATIONS

Kok-Meng Lee, "On The Development Of A Compliant Grasping Mechanism For On-Line Handling Of Live Objects, Part I: Analytical Model," 1999 IEEE/ASME International Conference on Advanced Intelligent Mechatonrics (AIM'99), Sep. 19-23, Atlanta, GA USA.

(Continued)

*Primary Examiner*—Jeffrey L. Gellner
*Assistant Examiner*—David J. Parsley
(74) *Attorney, Agent, or Firm*—Thomas, Kayden, Horstemeyer & Risley LLP

(57) ABSTRACT

A system and method for transferring live objects, such as chickens, to a shackle line are presented. The system and method include introducing a plurality of live objects to a singulator. The singulator isolates the individual live objects and places them in a pallet on a conveyor. The system may detect and remove cadavers from amongst the live objects. The conveyor leads the live objects to a grasper. The grasper positions the legs of the live objects so that a shackler can secure the legs of the live objects with a shackle. The live objects and the shackle are then inverted and passed on to a shackle line. The shackle line may be a kill line buffer or a kill line.

36 Claims, 36 Drawing Sheets
(23 of 36 Drawing Sheet(s) Filed in Color)

U.S. PATENT DOCUMENTS

| | | | |
|---|---|---|---|
| 4,272,863 A * | 6/1981 | Parker, Jr. | 452/183 |
| 4,307,683 A | 12/1981 | Parker, Jr. | 119/716 |
| 4,658,476 A | 4/1987 | van den Brink | 17/11 |
| 5,088,959 A | 2/1992 | Hemmskerk | 452/183 |
| 5,108,345 A | 4/1992 | Harben, III et al. | 452/183 |
| 5,129,857 A | 7/1992 | Keiter et al. | 452/179 |
| 5,134,971 A | 8/1992 | Krienke et al. | 119/713 |
| 5,186,677 A * | 2/1993 | Christensen et al. | 452/66 |
| 5,195,925 A * | 3/1993 | Gorans | 452/166 |
| 5,259,811 A | 11/1993 | Berry | 452/183 |
| 5,290,187 A * | 3/1994 | Meyn | 452/178 |
| 5,340,355 A * | 8/1994 | Meyn | 452/179 |
| 5,370,574 A | 12/1994 | Meyn | 452/179 |
| 5,484,380 A | 1/1996 | Bevins | 493/480 |
| 5,487,699 A * | 1/1996 | Tyrrell et al. | 452/66 |
| 5,514,033 A | 5/1996 | Berry | 452/182 |
| 5,672,100 A | 9/1997 | Nielson et al. | 452/188 |
| 5,897,201 A | 4/1999 | Simon | 362/268 |
| 5,944,598 A | 8/1999 | Tong et al. | 452/158 |
| 5,975,029 A | 11/1999 | Morimoto et al. | 119/843 |
| 6,056,637 A * | 5/2000 | Freeland et al. | 452/183 |
| 6,086,469 A * | 7/2000 | Cody et al. | 452/51 |
| 6,254,471 B1 | 7/2001 | Meyn | 452/177 |
| 6,254,472 B1 | 7/2001 | Meyn | 452/188 |
| 6,561,555 B1 * | 5/2003 | Millard | 292/251.5 |

FOREIGN PATENT DOCUMENTS

| | | |
|---|---|---|
| NL | 1003230 | 5/1996 |
| SU | 1576089 A2 | 4/1988 |
| WO | WO 94/19957 | 2/1994 |
| WO | WO 97/45003 A1 | 1/1999 ... 452/182 |

OTHER PUBLICATIONS

Kok-Meng Lee, A. Bruce Webster, Jeffry Joni, Xuecheng Yin, Richard Carey, Michael P. Lacy, Rishi Gogate, "On The Development Of A Compliant Grasping Mechanism For On-Line Handling Of Live Objects, Part II: Design and Experimental Investigation," 1999 IEEE/ASME International Conference on Advanced Intelligent Mechatonrics (AIM'99), Sep. 19-23, Atlanta, GA USA.

Kok-Meng Lee, Rishi Gogate, Richard Carey, "Automated Singulating System For Transfer Of Live Broilers," Proceedings of the 1998 IEEE International Conference on Robotics and Automation, May 16-21, Leuven, Belgium.

Kok-Meng Lee, "Kinematic Simulation And Analysis Of A High-Speed Live Broiler Transfer Mechanism," Proceedings of the 2000 Japan-USA Symposium on Flexible Manufacturing Systems, Jul. 23-26, Arbor, MI.

K-M. Lee "Kinematic Analysis of a High-speed Live Broiler Transfer Mechanism," Proc. of the 2000 Japan-USA Symposium on Flexible Manufacturing Systems, Jul. 23-26, Arbor, MI.

Daniel Fletcher, "Integrator's Digest", Jun. 1995, p. 97. Pursuant to 37 C.F.R. 1. 98(d) this reference was previously disclosed in parent U.S. Appl. No. 09/748,656 and issued as Patent No. 6,623,346.

BTG, "Automatic Chicken Shackling," Dec. 1995, Reference: 134332. Pursuant to 37 C.F.R. 1.98(d) this reference was previously disclosed in parent U.S. Appl. No. 09/748,656 and issued as Patent No. 6,623,346.

Lee, et al., paper entitled "Automation Intelligent Live Transfer" Undated, pp. 1-10.

Lee, et al. paper entitled "Automation Intelligent Live Transfer" Undated, pp. 1-9.

* cited by examiner

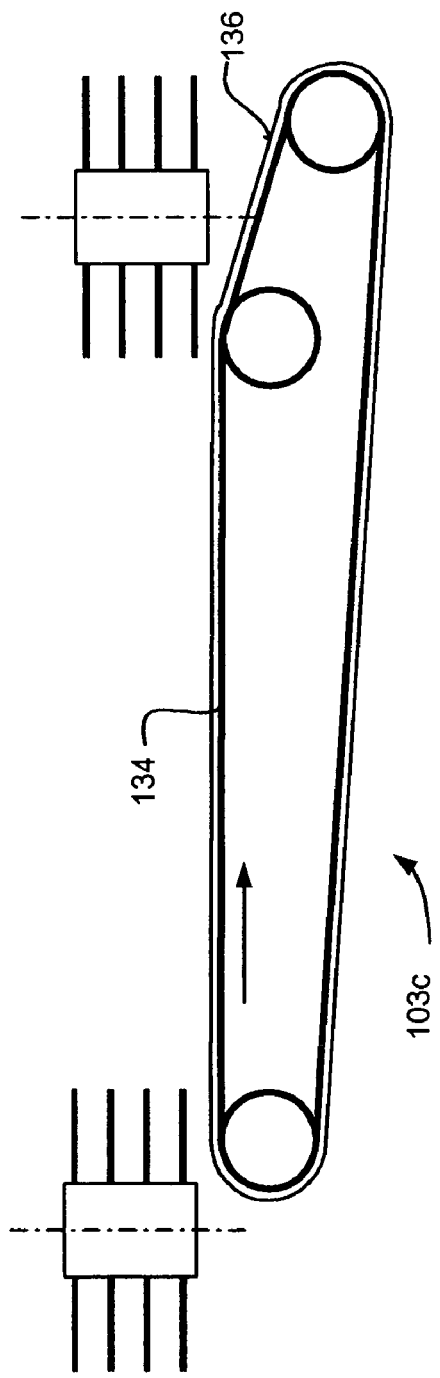

Singulating System

Pallet

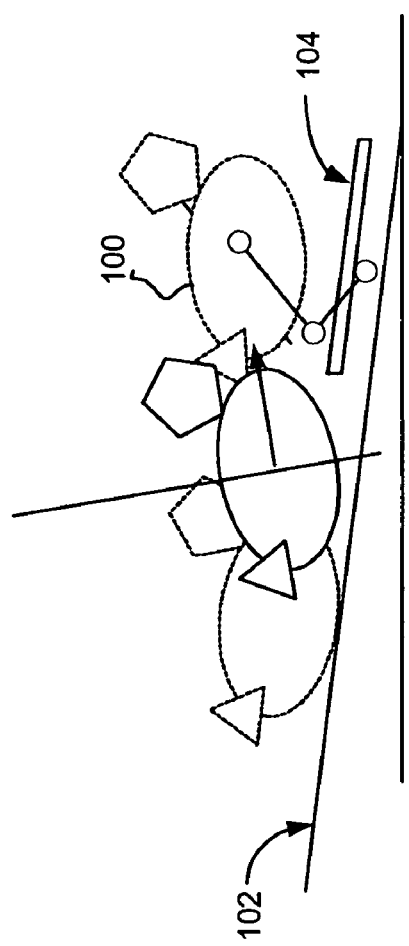

Shackle (a) Compliant Shackle

Awaiting Shackle

Rotated Shackle

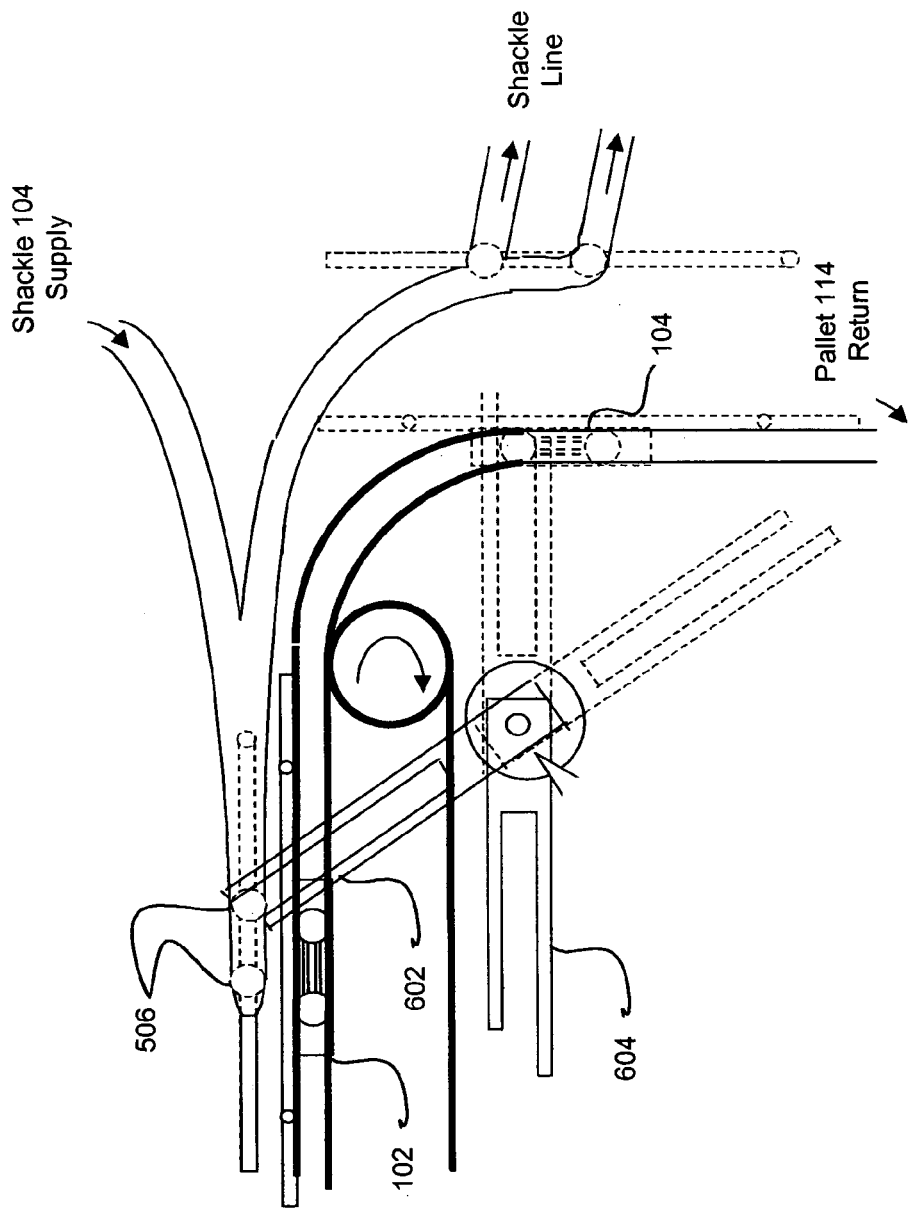

Imaging Neural Network

Imaging System

Imaging Neural Network

Plots for Use with
a Neural Network

Plots for Use with
a Neural Network

Plots for Use with
a Neural Network

System Operation Control Sequence

AUTOMATED FEET-GRIPPING SYSTEM

CROSS-REFERENCE TO RELATED APPLICATION

This application is a continuation-in-part (CIP) of U.S. patent application Ser. No. 09/748,656, filed Dec. 22, 2000 issued as U.S. Pat. No. 6,623,346, which claims priority to four copending U.S. provisional applications all entitled, "Method of Mechanical Transferring Live Broilers from Moving Conveyor to Shackle," having Ser. No. 60/171,990, filed Dec. 23, 1999; Ser. No. 60/177,576, filed Jan. 22, 2000; Ser. No. 60/197,362, filed Apr. 15, 2000; and Ser. No. 60/252,987, filed Nov. 23, 2000.

This application also claims priority to U.S. provisional patent application entitled, "Automated Feet-Gripping System," having Ser. No. 60/444,861, filed Feb. 4, 2003, which is incorporated herein by reference in its entirety.

STATEMENT REGARDING FEDERALLY SPONSORED RESEARCH OR DEVELOPMENT

The U.S. government and the Georgia Agricultural Technology Research Program may have a paid-up license in this invention and the right in limited circumstances to require the patent owner to license others on reasonable terms as provided for by the terms of U.S. Poultry and Eggs Association (U.S. P&E) Project Nos. 333, 413 and 446, both entitled, "Intelligent Automated Transfer of Live Birds to Shackle Line."

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention is generally related to the transfer of live objects to shackle lines and, more particularly, is related to a system and method for organizing, restraining and transferring live chickens from a farm to a processing facility.

BACKGROUND OF THE INVENTION

Manual handling of live birds is a hazardous and unpleasant task. There are potentials for a variety of injuries to human handlers since the birds tend to flail about when they are caught. Potential injuries include: cuts and scratches that can easily become infected in a chicken farm environment; a variety of respiratory and visual ailments resulting from the high level of dust and feathers; hands or fingers can get caught in moving shackle lines; and repetitive motion disorders. The unpleasantness associated with the manual handling of live birds results in high employee turnover rates at some plants. The high turnover rate results in the need to constantly retrain new employees. In addition, it is difficult to attract new workers to the job. In addition, manual handling of live birds may lead to bruising and downgrading of birds.

Despite the drawbacks, live birds are usually handled manually (from hatching through processing). The reason for manual handling is handling of live birds by automation presents unique challenges, such as the following: (1) Unlike handling of non-reactive objects, both the mechanical forces and the bird's natural reflexes contribute to the overall dynamics; (2) Live birds vary in size and shape, making handling automation difficult; (3) Since both the birds and the grasping fingers are compliant, contact forces depend on the surface geometry and are position/orientation dependent; and (4) In order to justify the need for automation from a cost-savings viewpoint, the mechanical devices must perform the repetitive task in a shorter amount of time, and with more accuracy, than a human.

Thus, a heretofore unaddressed need exists in the industry to address the aforementioned deficiencies and inadequacies.

The patent or application file contains at least one drawing executed in color. Copies of this patent or patent application publication with color drawings(s) will be provided by the Office upon request and payment of the necessary fee.

SUMMARY OF THE INVENTION

The present invention provides devices, systems, and methods for transferring live objects to a shackle line.

Briefly described, in architecture, one such system, among others can be implemented as follows. A plurality of live objects are introduced to a singulator. The singulator isolates the individual live objects and places them in a pallet on a conveyor. The system may detect and remove cadavers from amongst the live objects. The conveyor leads the live objects to a grasper. The grasper positions the legs of the live objects so that a shackler can secure the legs of the live objects with a shackle. The live objects and the shackle are then inverted and passed on to a shackle line. The shackle line may be a kill line buffer or a kill line.

The present invention can also be viewed as providing methods for automatically transferring a plurality of live objects with legs to a shackle line. In this regard, one such method, among others can be broadly summarized by the following steps: isolating each of the plurality of live objects; conveying the live objects to a grasper; positioning the isolated live objects with the legs of the live objects extended; securing the legs of the live objects to one of a plurality of shackles; inverting the live objects; and hanging each of the isolated live objects by the shackle.

Other devices, systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The patent or application file contains at least one drawing executed in color. Copies of this patent or patent application publication with the color drawing(s) will be provided by the Office upon request and payment fee. The components in the drawings are not necessarily to scale, emphasis instead being placed upon clearly illustrating the principles of the present invention.

Moreover, in the drawings, like reference numerals designate corresponding parts throughout the several views.

FIG. 1C is a third embodiment of the system for transferring live objects to a shackle line including a conveyor with a relatively flat portion and a declined portion.

FIG. 4 is a diagram showing the lifting of a live object and the securing of the legs of the live object with a shackle that is a part of the system for transferring live objects to a shackle line of FIGS. 1A–1C.

FIG. 6 is a side view of the system for synchronizing the inversion of the shackle of FIG. 4, the live object, and the pallet of FIG. 3.

DETAILED DESCRIPTION OF THE PREFERRED EMBODIMENT

Figure 1A:
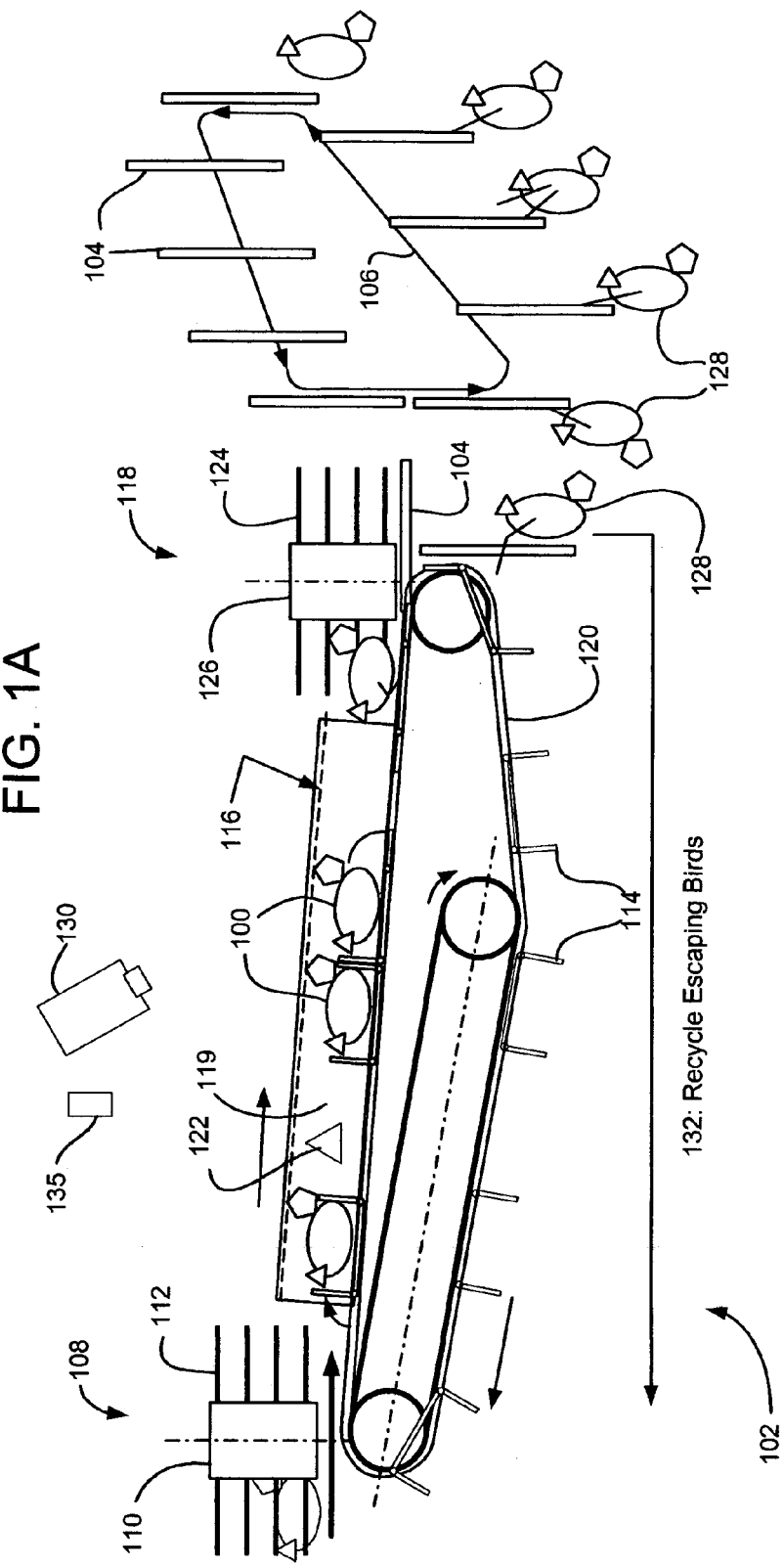
FIG. 1A is a side view of a preferred embodiment of the system for transferring live objects to a shackle line including a declined conveyor.

FIG. 1A is a side view of a preferred embodiment of the system for transferring live objects to a shackle line including a declined conveyor. FIG. 1A shows an automated system for transferring live objects, such as chickens 100, from a moving non-slip conveyor 102 to shackles 104 on a shackle line 106. A typical cycle of the system begins with the chickens 100 being unloaded from cages (not shown) onto a moving singulating entry conveyor (202 of FIG. 2). The singulating conveyor 202 transfers the birds to a singulator 108. The singulator 108 includes two separate hollow cylinders 110 (only one shown in the side view of FIG. 1). Each hollow cylinder 110 includes a set of counter-rotating fingers 112 mounted on the hollow cylinders 110.

The singulator 108 serves two functions. The first function is to cause the chickens 100 to stand. The second function is to isolate the chickens 100 so that they leave the rotating fingers 112 one at a time. As the cylinders 110 are rotated, tangential motion disperses the chickens 100 over the periphery of the rotating cylinders 110 while centripetal and gravitational forces cause the chickens 100 to move away from the cylinders 110 and drop onto the moving conveyor 102. The singulator 108 may also include a re-orienter (not shown) that may sense the direction the chickens 100 are facing and turn some chickens 100 so that all chickens 100 are facing forward.

Each of the cylinders 110 is driven by independent servomotors (not shown) rotating in opposite direction. The cylinders 110 each support a number of columns of evenly spaced rubber fingers 112. The use of counter-rotating fingers for electronic counting of live objects is known to those skilled in the art. The fingers 112 are compliant to accommodate the range of chickens 100. The fingers 112 are generally oval shaped to provide stiffness in the plane of travel and pliancy perpendicular to the plane of travel. The fingers generally have a rough surface to assist in maintaining contact with the chickens 100. The cylinders 110 are spaced sufficiently apart that only one chicken can pass through at a time.

The singulator 108 deposits the isolated chickens in one of a number of pallets 114 secured to the conveyor 102.

The chicken 100 is then transported on the conveyor 102 in the pallet 114 through an enclosed space with a low ceiling 116 where the chicken is confined to sit. Confining the chicken 100 to sit leads to a more uniform posture as the chickens 100 approach the grasper 118. The enclosed space is bounded by a pair of walls 119 to prevent the chickens 100 from voluntarily re-orienting themselves. The pallets 114 may be secured to the conveyor 102 frame by a rail 120.

The singulated chickens 100 may then be led through a cadaver detection system (CDS) consisting of a light emitting diode (LED) 122 and a photo-diode light detector (not shown). Each live chicken 100 immediately exiting the singulator 108 will be in a standing position distinctly different from that of any cadavers, this information is used to detect and remove cadavers from the automated system. The pair of walls 119 are transparent where necessary for the operation of the LED 122.

The singulated live chickens 100 are directed to a grasper 118 that includes a second system of counter-rotating fingers 124, which gently constrain the chickens 100 to allow the shackling to take place. Near the end of the conveyor 102, while the revolving fingers 124 of the grasper 118 continuously roll the chicken 100 forward, the leg kinematics of the chicken 100 are manipulated by appropriately controlling the grasper cylinder 126 speed relative to the conveyor 102 speed such that both legs of the chicken 100 are directed into the graspers 502 (of FIG. 5A) of an awaiting shackle 104 before the fingers 124 release the chicken 100. In the shackling operation, the grasper 118 constrains the chicken 100 and the chicken's legs are extended so the shackle 104 can secure the chicken's legs. The automatic transfer system described here does not require the chicken 100 to stand on its own will. Instead, it includes the rotating grasper fingers 124 to support the chicken 100 and uses a pre-determined body-to-feet differential speed to present both legs of the chicken 100 to the shackle 104.

Prior to entering the grasper 118, the chickens 100 may be held in a buffer on the conveyor. The buffer timing may be controlled by the system controller of FIG. 9.

Once the shackle 104 grips the chicken's legs, the chicken 100 and the shackle 104 are moved as a bird/shackle combination 128 towards the end of the conveyor 102. As shown in appendix G of U.S. Pat. No. 6,623,346, Principles of Operation, subsection "Forward Kinematics," the motion of the chicken's legs can be analyzed and predicted by appropriately controlling the velocities of the conveyor 102 and the rotating grasper cylinders 126. Appendix G, of U.S. Pat. No. 6,623,346, subsection "Inverse Kinematics," also shows the method to determine the rotating speed of the cylinders of the singulator 108 and the grasper 118 for a given conveyor speed, relative inclination of the rotating axis with respect to the conveyor 102 surface, and the chicken 100 size and entering pose. These calculated parameters will vary depending upon the environmental conditions and the variability in batches of live objects.

The variability within a particular batch can be calculated and used to control the automated system by use of an imaging system including a camera 130. To account for the varying sizes and entering posture, a digital (line or area) camera 130 with a collocated blue light source 402 (see FIG. 7A) (or light with blue filter) can be placed before the entrance of the grasper 118, preferably before the grasper cylinder 126 to obtain a silhouette of the chicken 100 against a retroreflective surface 404 background (such as a 3M Scotchite 580 Black). From the silhouette, the size and the posture (the orientation of the major axis of the chicken 100), and the leg posture can be computed. Typically, the chickens 100 are placed in a dark room (or room illumination with dim blue light) to calm the chickens 102. The combined retro-reflective background and the collocated blue filtered light source 402 reduce the computational load of the image processing. The ceiling 116 is made transparent where necessary for the operation of the camera 130. Once the chicken 100 orientation (forward or backward) and leg posture (joint angles) is computed, the operating speed can be determined in order to manipulate the legs of the chicken 100 using the equations given in the appendix G of U.S. Pat. No. 6,623,346, subsection "Inverse Kinematics," to re-adjust the rotational speed and compensate for the size/pose variation in real-time.

The weight of the bird/shackle combination 128 causes the bird/shackle combination 128 to topple and thus inverts the bird/shackle combination 128. The shackle 104 with the hanging chicken 100 is then transferred to the moving shackle line 106 which may be a buffer line or may be a kill line.

As shown in FIG. 1, in the preferred embodiment, the conveyor 102 declines slightly from the singulator 108 to the grasper 118. The conveyor is designed to incline downward so that the grasper fingers 124 grasp the chicken 100 by its body but allow the legs to extend freely between the hip joints and the feet on the conveyor 102 surface. The inclined surface further encourages the chicken 100 to sit since the bird's natural reflexes to moving on an inclined plane is to lower its center of gravity (CG) in order to maintain its balance.

For high-speed transferring operation, it is desired that the variation of the (initial) birds' posture as they enter the grasper 118 be minimized. Since most chicken's arriving at the system tend to sit (particularly in a relatively dark environment), the "sitting" posture is chosen as a nominal entry posture in the design and control of the automated transfer system. The system includes a ceiling 116 and clear walls 119 that cover and close the sides, respectively, of the conveyor 102. The ceiling may also extend to reach partially into or over the grasper 118. The walls 119 and ceiling 116 are clear to allow visibility, to allow for identifying carcasses, and to allow CDC imaging with the LED 122 and orientation imaging with the camera 130. The system for transferring live objects to a shackle line also includes a recycle conveyor 132 for transporting any escaping chickens back to the singulator 108 area.

Figure 1B:
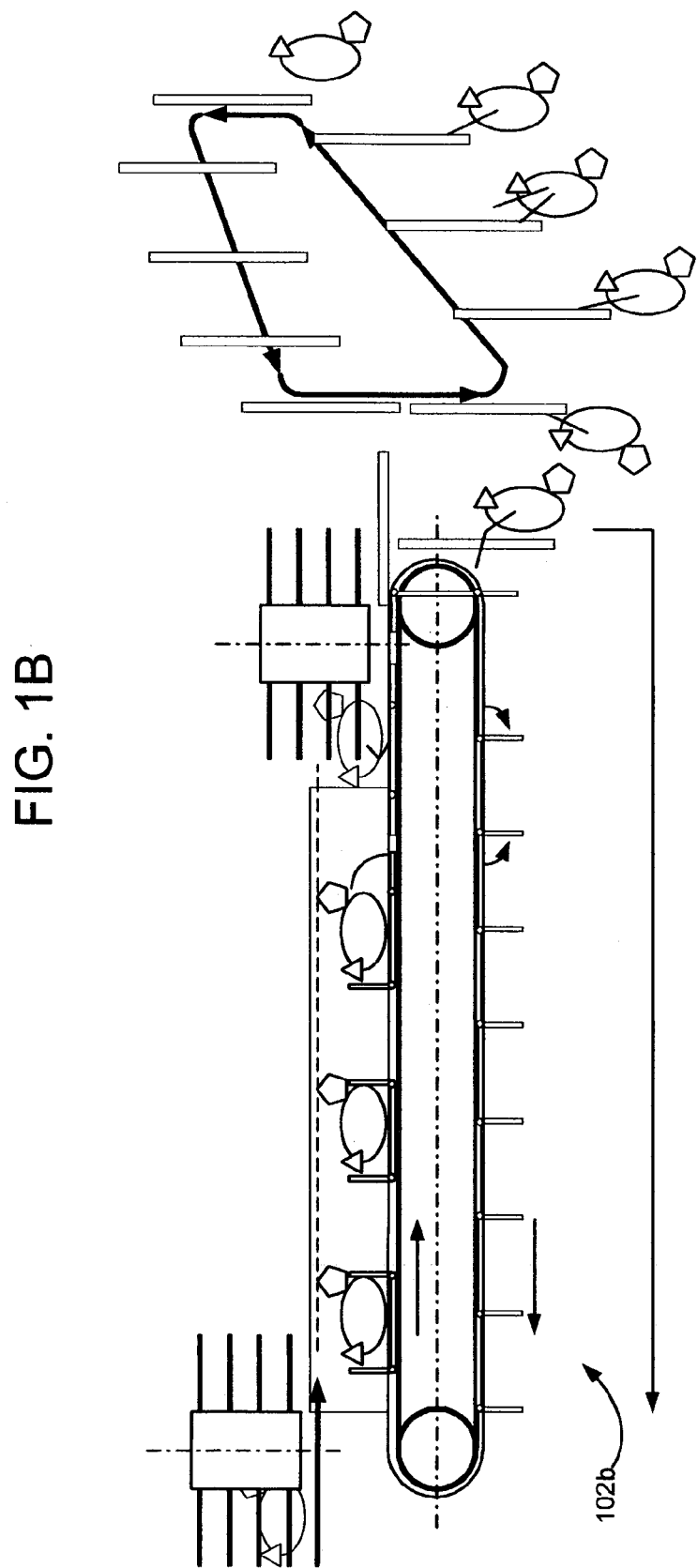
FIG. 1B is a side view of a second embodiment of the system for transferring live objects to a shackle line including a relatively flat conveyor.

FIG. 1B is a side view of a second embodiment of the system for transferring live objects to a shackle line including a relatively flat conveyor. The components of the second embodiment are similar to the components of the preferred embodiment other than the conveyor 102b that is relatively flat.

FIG. 1C is a third embodiment of the system for transferring live objects to a shackle line including a conveyor with a relatively flat portion and a declined portion. The components of the third embodiment are similar to the components of the preferred embodiment other than the conveyor 103c that has a relatively flat portion 134 and a declined portion 136.

Figure 2:
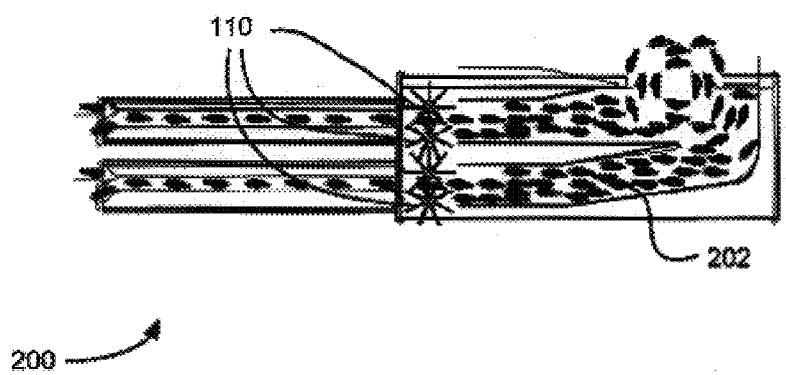
FIG. 2 is a top view of the singulating system for transferring live objects to a shackle line of FIGS. 1A–1C.

FIG. 2 is a top view of the singulating system 200 for transferring live objects to a shackle line of FIGS. 1A–1C. The singulating system 200 is shown as a dual line system but may be a single line system for the present invention. The singulating system includes a singulating conveyor 202 and a singulator 108 for two lines showing the use of two singulating cylinders 110 for each line of the singulating system.

Figure 3:
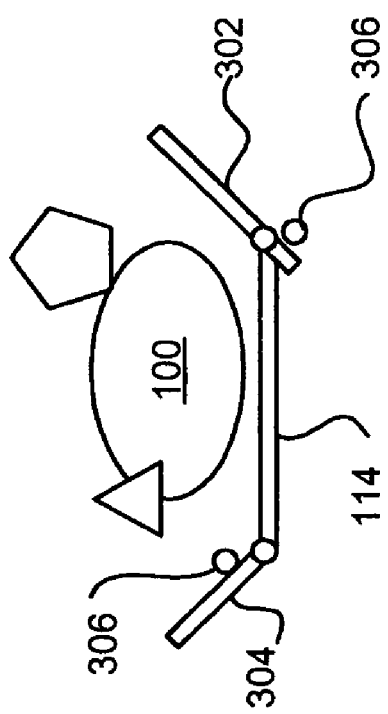
FIG. 3 is side view of a pallet that is attached to the conveyor of the system for transferring live objects to a shackle line of FIGS. 1A–1C.

FIG. 3 is side view of one of the pallets 114 that are attached to the conveyor of the system for transferring live objects to a shackle line of FIGS. 1A–1C. The chicken 100 is dropped from the singulator 108 into the pallet 114. The pallet 114 includes a pair of latch-able panels (front 302 and back 304) to restrain the chicken 100 from walking on the conveyor 102. Immediately after the chicken 100 is dropped into the pallet 114, the rear panel 304 of the pallet 114 is lowered. The chicken 100 will generally try to balance itself by lowering its center of gravity. After the chicken 100 enters the pallet 114, the rear panel 304 is raised. The panels 302 and 304 are unlatched and flattened before entering the grasper 118, and thus minimizing the visual response of the chicken 100 to the revolving fingers 112 of the grasper 118. The panels 302 and 304 return to the original positions by gravity. The panels may be raised and lowered by pins 306.

The pallets 114 rotate with the bird/shackle combination 128 at the end of the conveyor 102. Rotating the pallets with the bird shackle combination 128 prevents any escaping chickens 100 from being trapped between the conveyor 102 and the shackle 104, thus, allowing the escaping chicken 100 to be dropped on the recycling conveyor 132 unhurt. Since the pallet 114 is rotated with the chicken 100, the chicken's resistance by gripping on the floor of the pallet 114 has no effect on the inverting process. And, since the time required to invert the chicken 100 depends only on the rotational speed, it significantly minimizes the chicken's 100 struggle.

As compared to the conveyor 102, individual pallets 114 also offer an advantage for controlling the leg kinematics of the chicken 100. The chicken 100 is sensitive to the declination of the conveyor 102 surface. The portion of the conveyor 102 surface, where the incoming chickens 100 are on the queue, is kept constant in order to minimize the chicken's 100 natural reflexes. The degree that the rotating axes of the grasper cylinder 126 can be tilted is limited since the grasper fingers 124 would interfere with the declined conveyor 102.

On the other hand, individual pallets 114 are short and can travel on a much steeper inclined track below the grasper fingers 124. In addition, the conveyor 102 is designed such that as the chicken 100 is grasped at a constant height, the pallet 114 is lowered, where the legs are inserted to the shackle 104, then the conveyor 102 is tilted as the pallet 114 and shackled chicken 100 are moving forward, and finally the bird/shackle combination 128 is inverted, and the bird/shackle combination 128 is separated from the pallet 114. Thus, the use of the pallet 114 provides a more effective means to insert the leg into the shackle 104 before inverting the chicken 100.

FIG. 4 is a diagram showing the lifting of a live object and the securing of the legs of the live object with a shackle that is a part of the system for transferring live objects to a shackle line of FIGS. 1A–1C. FIG. 4 shows the surface of the conveyor 102, the shackle 104, and the chicken 100 to be shackled. FIG. 4 shows the chicken 100 as the chicken 100 is passing through the grasper 118. For any particular conveyor 102 slope and speed, the velocity of the chicken's 100 body must be lifted over the shackle 104 and the shackle 104 must grip the legs of the chicken 100.

Figure 5A:
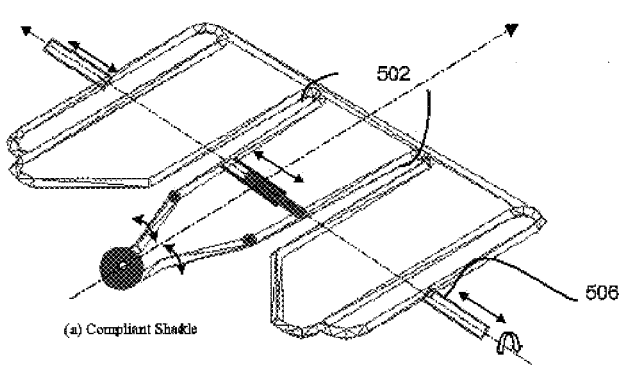
FIG. 5A. is a perspective view of the shackle for securing the legs of a live object shown in FIG. 4.

FIG. 5A. is a perspective view of the shackle 104 for securing the legs of the chicken 100 shown in FIG. 4. The shackle includes a gripping area 502 for securing the legs of the chicken 100 when the bird/shackle combination 128 is inverted and a shackle support 506.

FIG. 5A shows a compliant shackle, which is designed to adapt non-symmetric insertion of the legs. By allowing the spacing between the two gripping areas 502 to slide freely, the shackle provides negligible resistance along the Ys direction but provides a relatively high stiffness in the Xs direction. Thus, the design allows the legs of different spacing as well as different arrival timing to be inserted before moving them along the Xs direction.

Figure 5B:
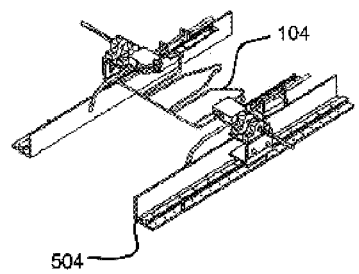
FIGS. 5B and 5C show perspective views of the shackle and shackle support awaiting the arrival of a live object (FIG. 5B) and the rotated shackle and shackle support (FIG. 5C) rotated as it would be while securing the legs of the live object.
Figure 5C:
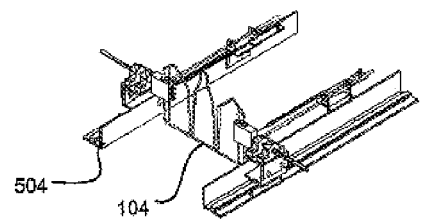

FIGS. 5B and 5C show perspective views of the shackle 104 and the shackle support 504 awaiting the arrival of a chicken, FIG. 5B, and the rotated shackle 104 and shackle support 504 in the position the shackle is as the bird/shackle combination 128 is inverted.

FIG. 6 is a side view of the system for synchronizing the inversion of the shackle 104, the chicken 100, and the pallet 114. FIG. 6 shows a shackle 104 entering the at the top right, a first slider 602 that positions an empty shackle 104 by the shackle support 506 such that it provides a restoring force when the legs of the chicken 100 are engaged in the shackle 104. The bird/shackle combination 128 travels towards the end of the conveyor 102, where the second slider 604 engages the pallet 114. As the relative angular positions of the two sliders 602 and 604 are fixed, the pallet 114 and the bird/shackle combination 128 are synchronized to rotate together. Once the bird/shackle combination 128 rotates, the pallet 114 is separated from the bird/shackle combination 128. A servomotor (not shown) controls the shackle 104 motion and synchronizes the rotational motion of the pallet 114, shackle 104, and the bird/shackle combination 128. Once the grasper 118 engages the legs, the servomotor behaves as a rotational spring, and exerts a restoring force such that the legs of the chicken 100 are driven further into the shackle 104, while allowing the bird/shackle combination 128 to travel together.

The cam motion of the shackle 104 is designed such that: The conveyor feeds the legs of the chicken 100 to the gripping area 502 of the shackle 104 while the rotating fingers 124 push the bird out of the grasper 118; Once the legs are gripped, both the bird and the shackle are pushed together towards the end of the conveyor 102; At the end of the conveyor, the shackle/bird combination rotates under its own weight (or with additional counter-weight) along with the momentum contributed by the fingers and the conveyor; and once the broiler is inverted, the bird/shackle combination is available for transferring to a moving processing line.

There are several designs that could accomplish the above motion such as, the use of a mechanical spring 508 as illustrated in the figures; the use of a spring-loaded ball plunger so that the fingers/conveyor combination pushes the bird's feet to unlatch the plunger; and the use of a computer-controlled electromechanical linear motor position servo to drive the shackle mechanism.

A typical example position servo configuration is a P01-23×160/200×340 that includes position feedback and its associated power driver, control interface, and software manufactured by LinMot. The active shackle mechanism provides a flexible means to position the shackle using the spring-loaded ball plunger or to modify the stiffness using the mechanical spring 508. An alternative means to achieve the shackle motion control is to use a position-feedback cylinder, and its associated control valve and interface with the computer manufactured by Bimba Manufacturing Co. Yet another alternative means of achieving computer-control is to use a computer-controlled rotary motor with a reciprocating mechanism such as an Uhing Linear Drive Nut manufactured by Amacoil, Inc.

Figure 7C:
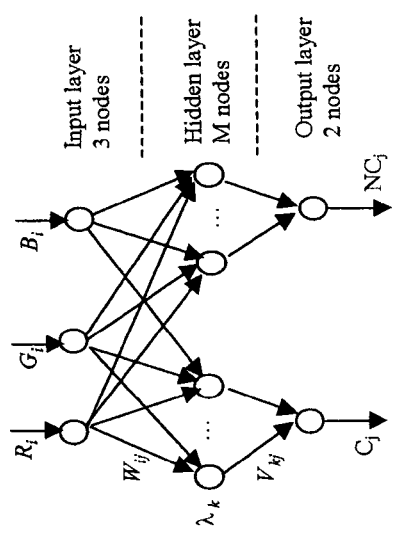
FIGS. 7B and 7C show a block and a node diagram of a neural network that shows one system for controlling the operation of the system for transferring live objects to a shackle line of FIGS. 1A–1C.
Figure 7A:
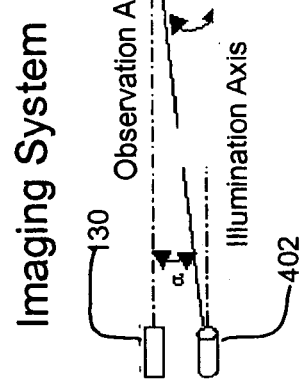
FIG. 7A is an imaging system for determining the orientation of the live objects of the system for transferring live objects to a shackle line of FIGS. 1A–1C.

FIG. 7A shows an imaging system for determining the orientation of the live objects of the system for transferring live objects to a shackle line of FIGS. 1A–1C. The imaging system includes a camera 130, a light source 402, and a retro-reflective surface 404.

Figure 7B:
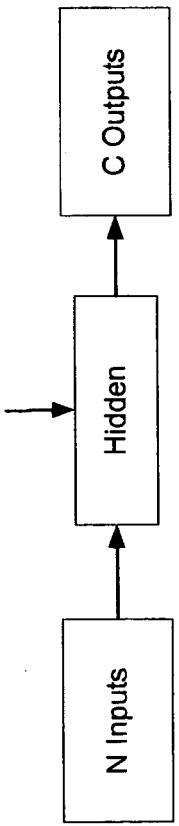

FIGS. 7B and 7C show a block and a node diagram of a neural network that shows one system for controlling the operation of the system for transferring live objects to a shackle line of FIGS. 1A–1C. An alternative method to determine the grasper cylinder 126 speed to compensate for the size and posture variation of the chickens 100 is to use a trained neural network algorithm with the following input-output training pairs, which could be prepared experimentally:

5 Inputs=[$w$; $h$, $\beta$; $\phi_1(t_f)$, $\phi_2(t_f)$]; 1 Output=$\omega$ where h and β describe the height of the geometrical center and the orientation of the silhouette of the incoming bird. These parameters, which characterize the posture of the incoming bird, can be obtained using a digital camera 130 with image processing software. With the input-output pairs, the network can be obtained using Levenberg-Marquardt learning method (see, for example, the MATLAB Neural Net Toolbox Manual). Once the network is trained, it can be used to determine the drum speed needed for a particular set of inputs. A sample program, such as the one below can be used to obtain the leg posture from the chicken silhouette obtained from the digital camera.

Sample Program range=[min(inputs)' max(inputs)'];
rand('state',0);
num_vals=length(inputs);
index=randperm(num_vals);

% Split the Training Data Set into Training and Validation Sets
train$_{13}$ in=inputs(index(1:floor(num_vals/2)),:)';
train_out=outputs(index(1:floor(num_vals/2)))';
validate.P=inputs(index(ceil(num_vals/2):num_vals),:)';
validate.T=outputs(index(ceil(num_vals/2):num_vals))';

% Form the Initial Network and Set Parameters
legnet=newff(range,[5 1],{'tansig' 'purelin' });
legnet.trainParam.epochs=50;
legnet.trainParam.show=[ ];

% Train Using Default Levenberg-Marquardt Method

% See the NNET Toolbox Manual.
[legnet,legperf]=
train(legnet,train_in,train_out,[ ],[ ],validate);
figure (2),clf
semilogy(legperf.epoch',legperf.perf',legperf.epoch',
    legperf .vperf', '--')
xlabel('Epoch Number'),ylabel('Mean Squared Error');
title_s=sprintf('Leg-motion NN Performance (Min training MSE=% g)', . . .
    min(legperf.perf));
title(title_s),legend('Training','Validation',0);

The above algorithm can be used to obtain the leg posture from the bird silhouette obtained digitally with 3 Inputs=[$w$; $h$, $\beta$;};2 Outputs=[$\phi_1(t_f)$, $\phi_2(t_f)$]

which can be used with the inverse kinematics to determine the operating speeds.

Figure 8A:
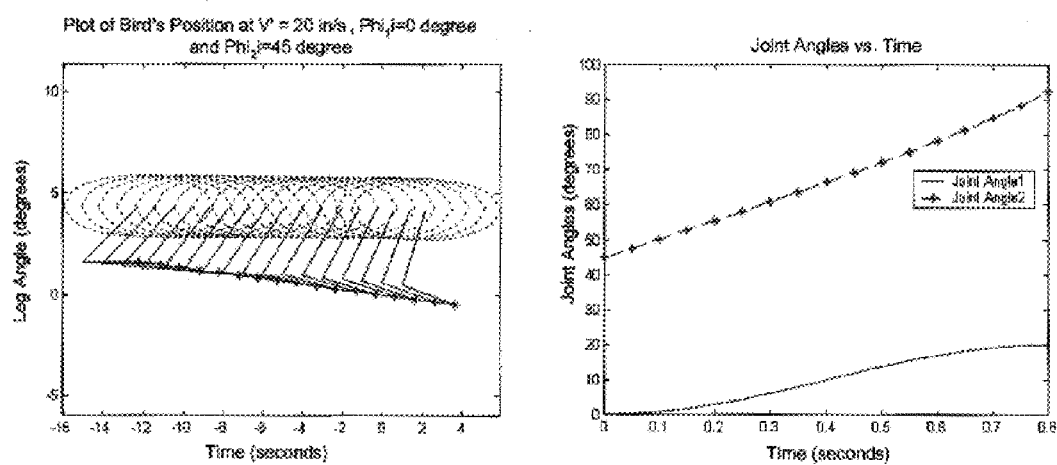
FIGS. 8A–8C are sample plots for use in controlling the system for transferring live objects to a shackle line of FIGS. 1A–1C through the use of the neural network of FIGS. 7B and 7C.
Figure 8B:
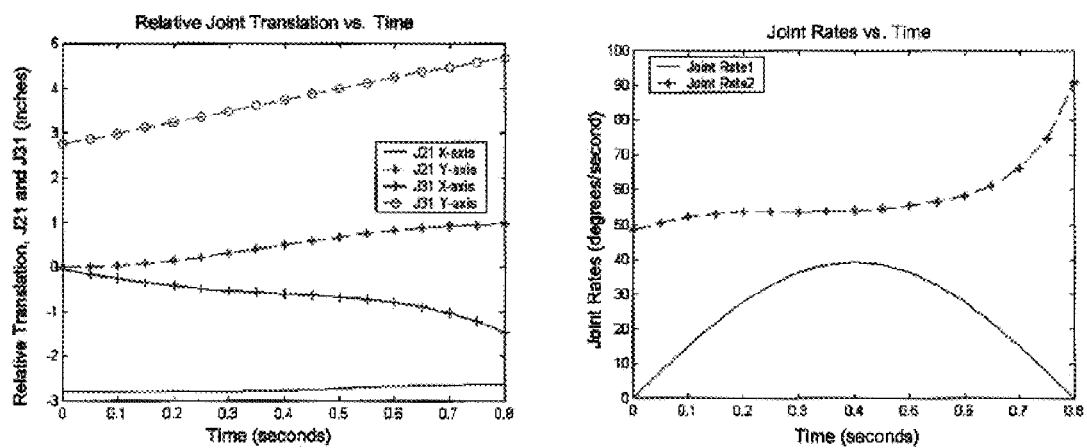
Figure 8C:
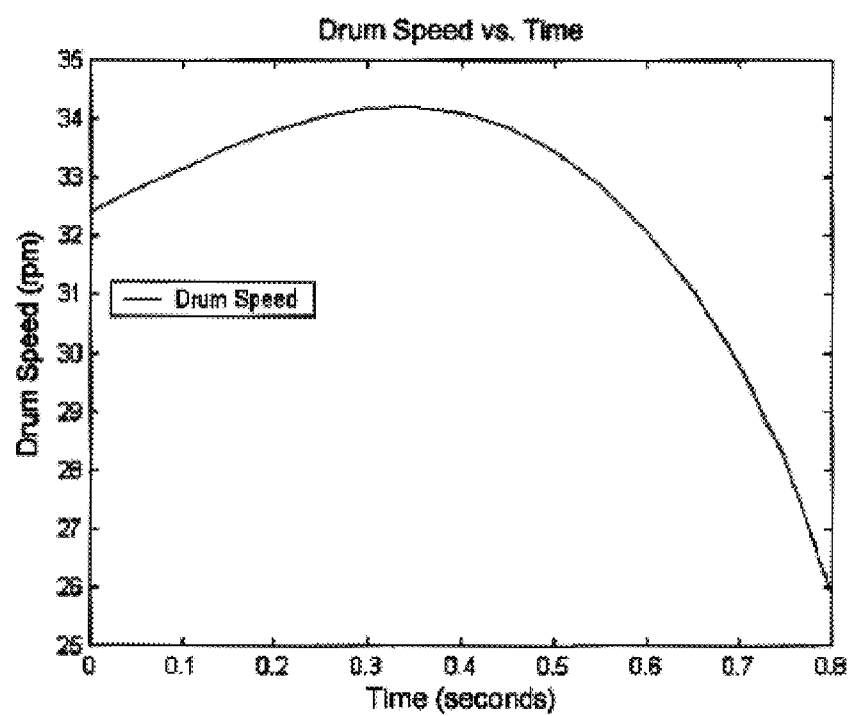

FIGS. 8A–8C are sample plots for use in controlling the system for transferring live objects to the shackle line 106 of FIGS. 1A–1C through the use of the neural network of FIGS. 7B and 7C.

Figure 9:
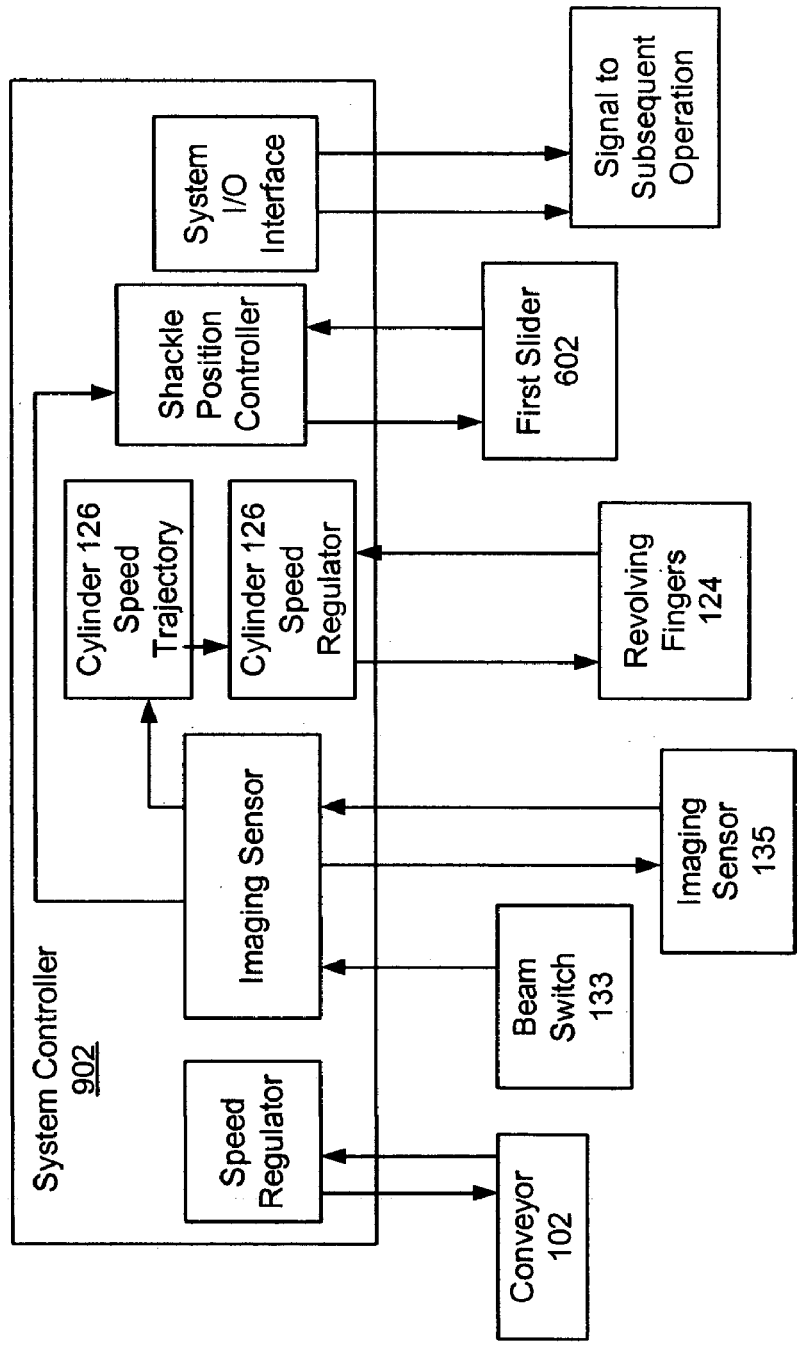
FIG. 9 is a block diagram of a system operation control sequence for controlling the operation of the system for transferring live objects to a shackle line of FIGS. 1A–1C.

FIG. 9 is a block diagram of a system operation control sequence for controlling the operation of the system for transferring live objects to a shackle line of FIGS. 1A–1C.

The operations of the system are controlled by a system controller 902. The system controller coordinates the following sequential tasks:

1. Continuous control of the conveyor 102 speed by a digital PID controller.
    1a: voltage command;
    1b: tachometer feedback
2. The beam-switch 133 signals the arrival of a chicken 100.
3. The imaging sensing and control algorithm
    3a: triggers the imaging sensor 135 to capture an image of an incoming bird through the camera 130
    3b. store and process image. The initial posture of the chicken 100 is computed.
    3c: compute the desired grasper cylinder 126 speed profile
    3d: compute the desired shackle 104 position
4. Control the grasper cylinder 126 speed by a digital PID regulator with a tracking controller.
    4a: voltage command;
    4b: tachometer feedback
5. Control the desired position by a digital PID controller.
    5a: voltage command;
    5b: position and force feedback
6. Signal the completion of the cycle.

Appendices A–J of U.S. Pat. No. 6,623,346 provide analytical models, design calculations, system criteria, kinematic simulation analysis, imaging system analysis, principles of operation, modeling, motion prediction analysis, and design algorithm related to the automated transfer of live objects apparatus and method. Appendices A–J of U.S. Pat. No. 6,623,346 are incorporated herein in their entirety by reference.

The neural network of the present invention can be implemented in hardware, software, firmware, or a combination thereof. In the preferred embodiment(s), the neural network is implemented in software or firmware that is stored in a memory and that is executed by a suitable instruction execution system. If implemented in hardware, as in an alternative embodiment, the neural network can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 10:
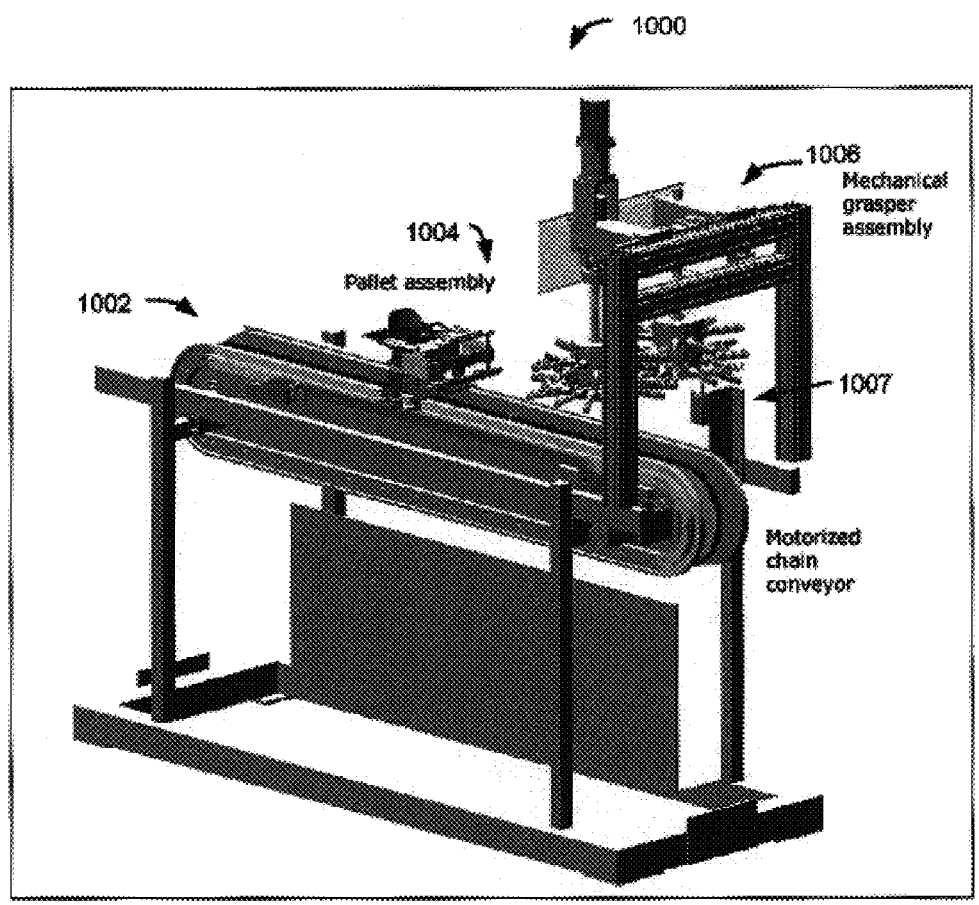
FIG. 10 is a plan view depicting a system for an automated feet-gripping system in accordance with a preferred embodiment of the invention.

FIG. 10 is a plan view depicting a system 1000 for a automated feet-gripping system in accordance with a preferred embodiment of the invention. The system 1000 includes a conveyor 1002, such as motorized chain, an example of an automated feet-gripping system 1004, a grasper system 1006 and a shackle control mechanism 1007. The system 1000 provides for a mechanical inversion of the live objects when the live objects reach an end of the conveyor and continue to rotate and travel along an underside of the conveyor 1002.

Figure 11:
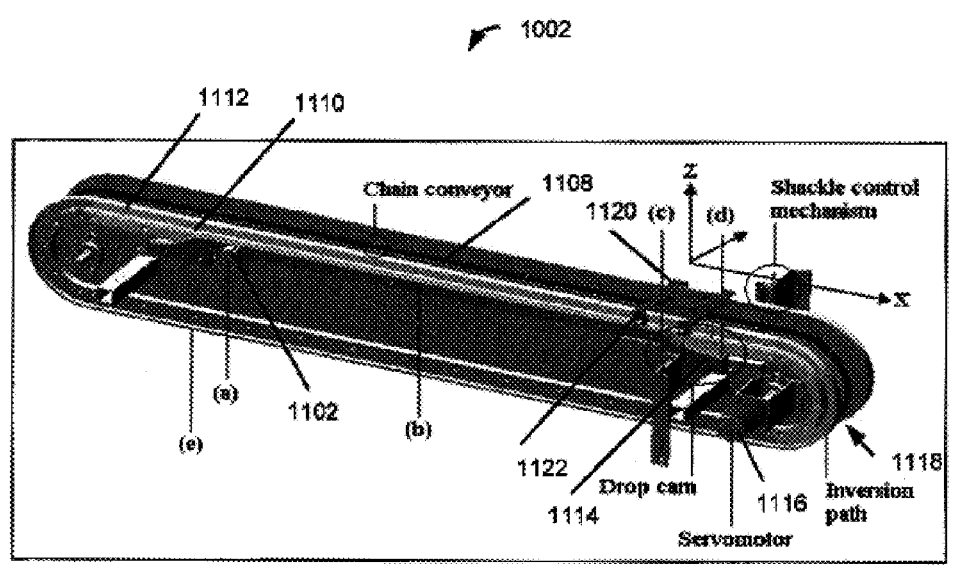
FIG. 11 is a schematic diagram of a motorized chain conveyor in accordance with a preferred embodiment of an automated feet-gripping system.

FIG. 11 is a schematic diagram of a motorized chain conveyor 1002 in accordance with a preferred embodiment of an automated feet-gripping system. The conveyor 1002 includes a chain 1108, a plurality of tracks 1110, 1112, a drop cam 1114, a servomotor 1116, an inversion path 1118, and a shackle control mechanism 1007 (FIG. 10). A plurality of trolleys (only one shown for simplicity) 1120 is movably affixed to the conveyor 1002. The trolley 1120 includes rollers 1122 for traversing along the track 1112 in a x-direction. The x-direction, as referred to in this disclosure, is the direction of travel of the conveyor 1002. Hence, if a live object is facing in the direction of the conveyor 1002, then the x-direction refers to the anterior-posterior axis of the live object 100. Similarly, the z-direction, as referred to in this disclosure, refers to the superior-inferior axis of the live object 100 when the live object is positioned upright on the conveyor 1002. Likewise, for live objects positioned upright on the conveyor 1002 and facing the direction of travel of the conveyor 1002, the y-axis refers to the lateral axis of the live object 100.

Since the conveyor 1002 is configured to transport live objects, it is desirable to manage the timing of each sequence such that there is minimal disruption in the transport of the live object. In this regard, some embodiments of the process begin when the pallet assembly 1204 (FIG. 12) reaches a magnetic sensor 1102 and triggers the magnetic sensor 1102. The triggering of the magnetic sensor 1102 provides a landmark time for the beginning of the process. Upon triggering the magnetic sensor 1102 (labeled (a) in FIG. 11), the pallet assembly 1204 travels along the conveyor 1002 (labeled (b) in FIG. 11) until the pallet assembly 1204 reaches the top of the drop cam 1114. As the live objects arrive at the top of the drop cam 1114 (labeled (c) in FIG. 11), the live objects are secured by fingers 1706 on a pair of rotating hands 1702, and moved forward in the x-direction by the rotating hands 1702. The rotating hands 1702 and the fingers 1706 are shown in greater detail with reference to FIGS. 17, 18, and 19 below.

As the live objects travel forward (x-direction) and downward (negative z-direction) along the drop cam 1114 (between (c) and (d) in FIG. 11), the legs of the live object are inserted into a shackle assembly 1302 and locked into the shackle assembly 1302 by a trap bar 1410. The shackle assembly 1302 and trap bar 1410, along with their operation, are shown in greater detail with reference to FIGS. 13A through 13E, FIGS. 14A through 14H, and FIG. 15 below.

Upon reaching the bottom of the drop cam 1114 (labeled (d) in FIG. 11), the live objects are ejected from the rotating hands 1702 along the inversion path 1118, which inverts the live objects. Being inverted, the live objects travel between the inversion path 1118 and a release point (labeled (e) in FIG. 11), where a quick-release mechanism releases the live objects. As shown in this embodiment, each step of the process is timed to provide a smooth operation of the entire system 1000.

Figure 12:
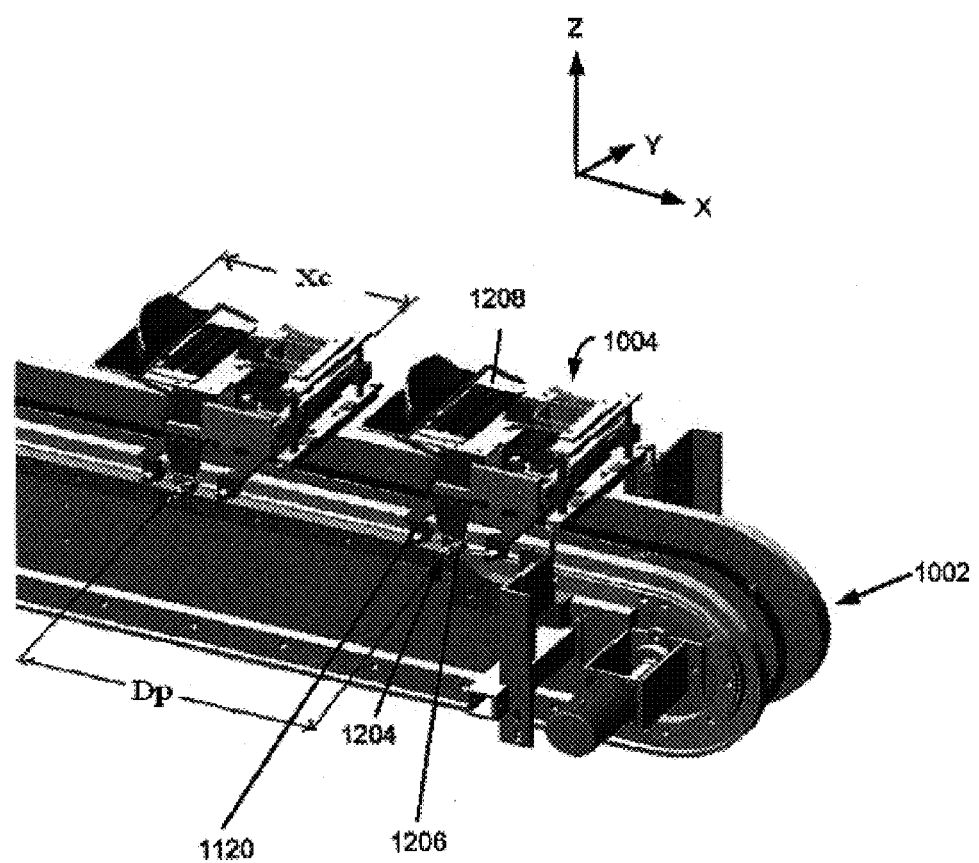
FIG. 12 is a schematic diagram of a motorized chain conveyor having automated feet-gripping systems thereon in accordance with a preferred embodiment of the invention.
Figure 17:
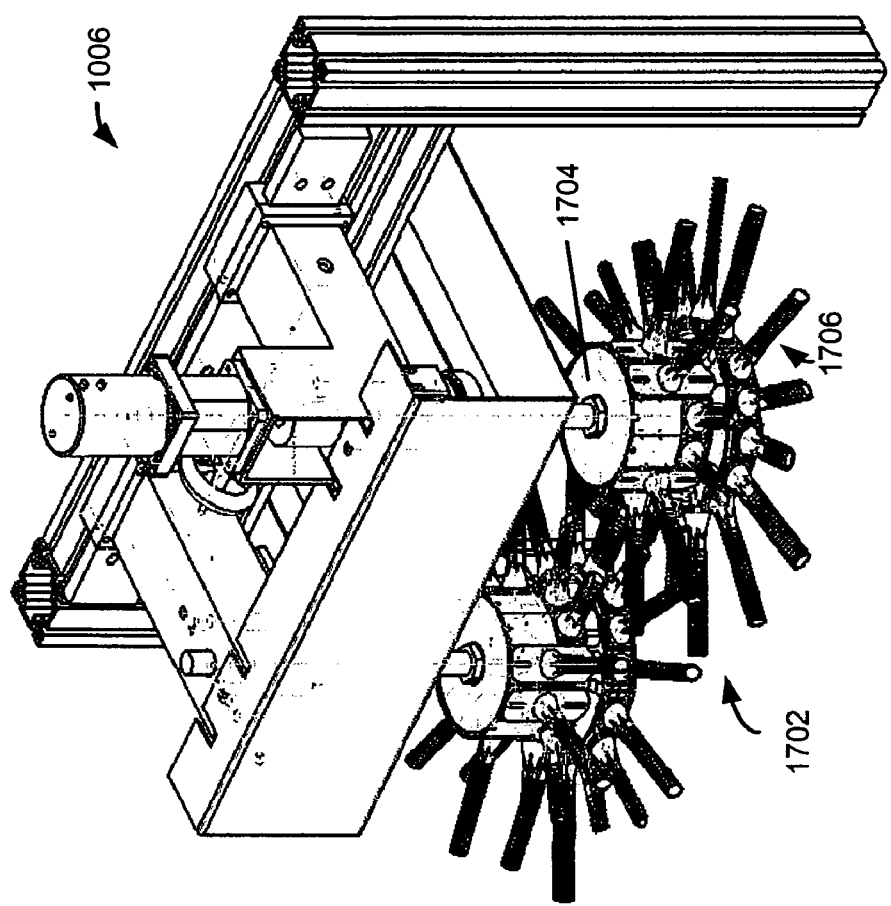
FIG. 17 is a schematic view of an illustrative embodiment of a grasper system of an automated feet-gripping system in accordance with a preferred embodiment of the invention.

FIG. 12 is a schematic diagram of a motorized chain conveyor 1002 having a plurality of automated feet-gripping system(s) 1004 thereon in accordance with a preferred embodiment of the invention. In a preferred embodiment, the automated feet-gripping system 1004 includes the trolley 1120 that traverses along tracks 1112 of the conveyor 1002 in the x-direction (anterior-posterior axis). The automated feet-gripping system 1004 includes a pallet assembly 1204. The pallet assembly 1204 includes rollers 1206 that run along the track 1110. Upon encountering the drop cam 1114, rollers 1122 of the trolley 1120 continue to traverse in an x-direction while the rollers 1206 of the pallet assembly 1204 follow the drop cam profile causing the surface of a pallet 1208 to lower. The operation of the trolley 1120 and its related components is shown in FIGS. 13A through 15. In a preferred embodiment, a body of the live object 100 is supported by the grasper system 1006, as shown in FIG. 17, and thus the feet of the live object 100 are extended in a substantially vertical direction (i.e., z-direction or superior-inferior axis of the live object).

FIGS. 13A through 13E are schematic diagrams of an illustrative example of degrees of movement of an automated feet-gripping system 1004 in accordance with a preferred embodiment of the invention. In an example, the trolley 1120 traverses along the track 1112 in a x-direction. The pallet assembly 1204 traverses along the track 1110 in a x-direction and can also move in a z-direction. A shackle assembly 1302 of the automated feet-gripping system 1004 is movably affixed to the pallet assembly 1204 and travels in a x-direction and has flexibility to move in a z-direction. The trolley 1120 and pallet assembly 1204 travel together on two separate tracks of the conveyor 1002 such that the pallet assembly 1204 travels with the trolley in the x-direction but is free to slide vertically relative to the trolley along the z-direction. When the trolley 1120 encounters the drop cam 1114, the pallet assembly 1204 follows the drop cam profile and the pallet z-translational guide 1304 provides for the pallet assembly 1204 having movement in the z-direction along the lowered track 1110 while the trolley 1120 continues to travel in a x-direction.

Figure 13A:
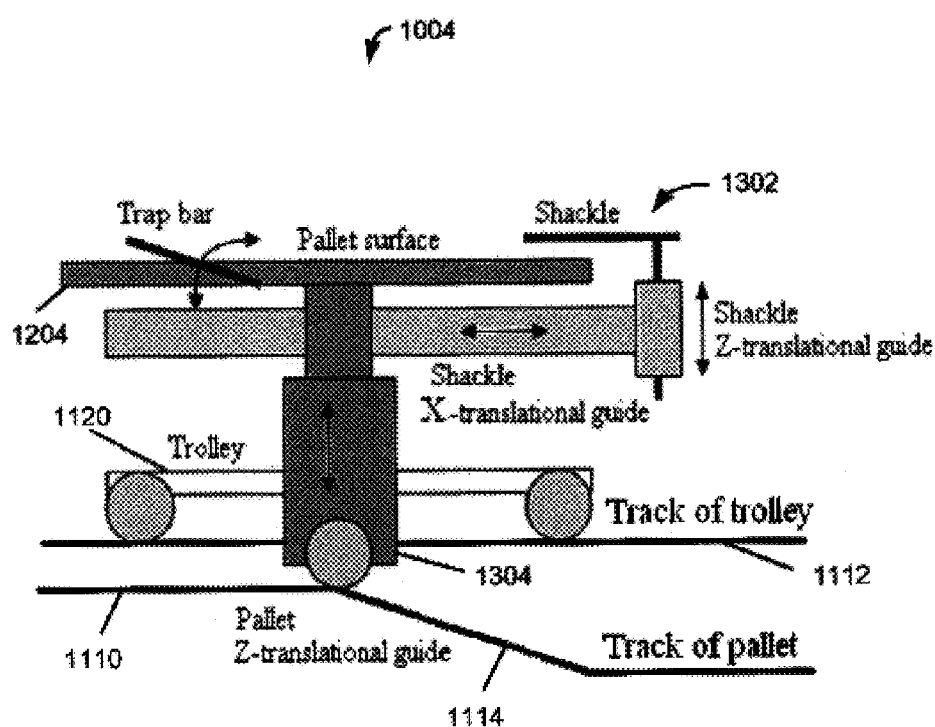
FIGS. 13A through 13E are schematic diagrams of an illustrative example of degrees of movement of an automated feet-gripping system in accordance with a preferred embodiment of the invention.
Figure 13B:
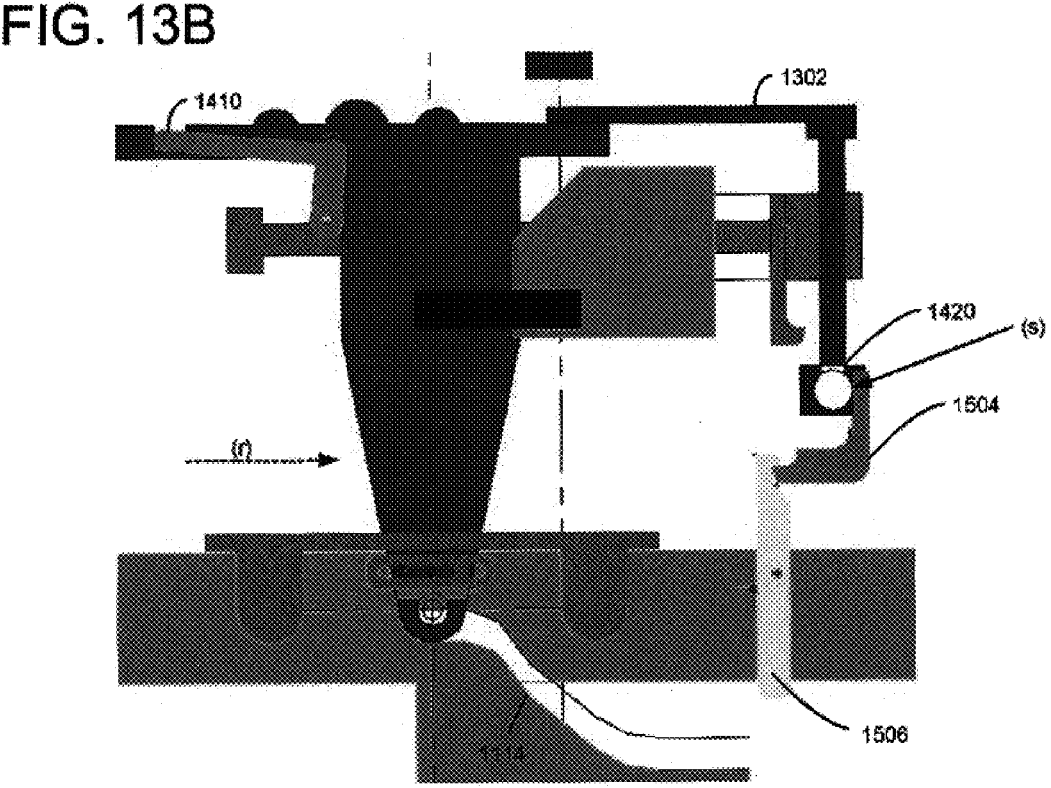

Graphically illustrated, FIGS. 13B through 13E show an embodiment of the operation of the feet-gripping system 1004. As shown in FIG. 13B, the trolley 1120 moves in the x-direction according to the arrow (r). Upon reaching the top of the drop cam 1114, a motion control rod 1420, which is a part of the shackle assembly 1302, contacts a shackle stopper 1504 at point (s). Hence, when the trolley 1120 reaches the top of the drop cam 1114, the trolley 1120 continues to move in the x-direction while the shackle assembly 1302 stops due to the shackle stopper 1504.

Figure 13C:
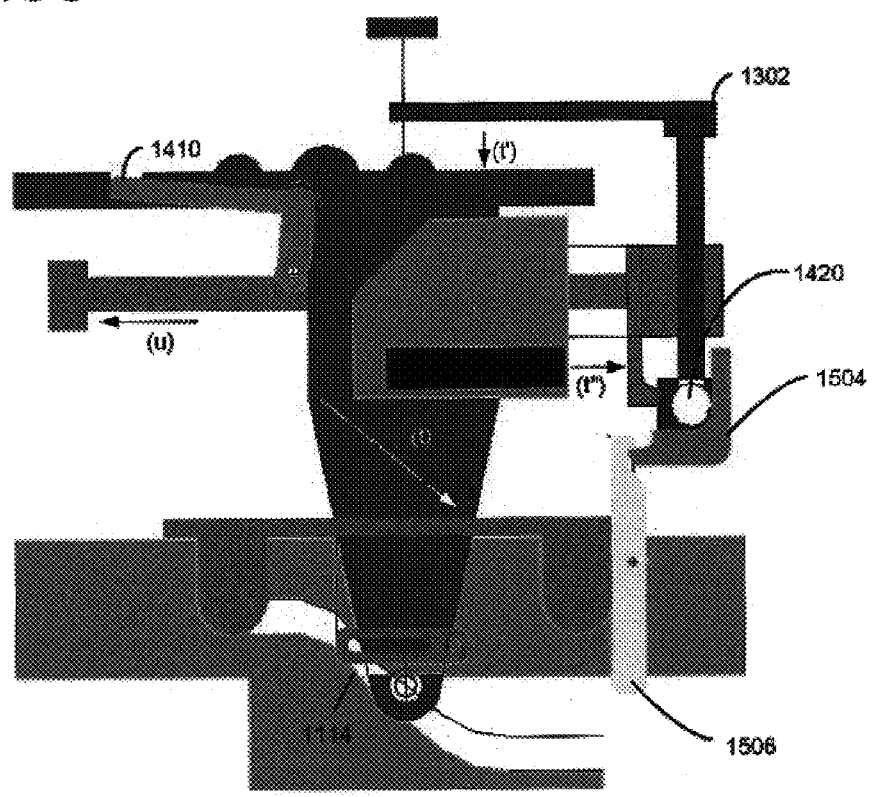

Continuing in FIG. 13C, the trolley 1120 continues in the x-direction (shown as (t") in FIG. 13C) and, consequently, also drops in the negative z-direction (shown as (t') in FIG. 13C), thereby resulting in a downward diagonal travel (shown as (t) in FIG. 13C). Meanwhile, the shackle assembly 1302 remains stationary due to the impediment provided by the shackle stopper 1504. Hence, from the framework of the trolley 1120, the shackle assembly 1302 travels in the direction of the arrow (u). The relative movement between the trolley 1120 and the shackle assembly 1302 brings a trap bar 1410 in closer proximity to the shackle assembly 1302.

Figure 13D:
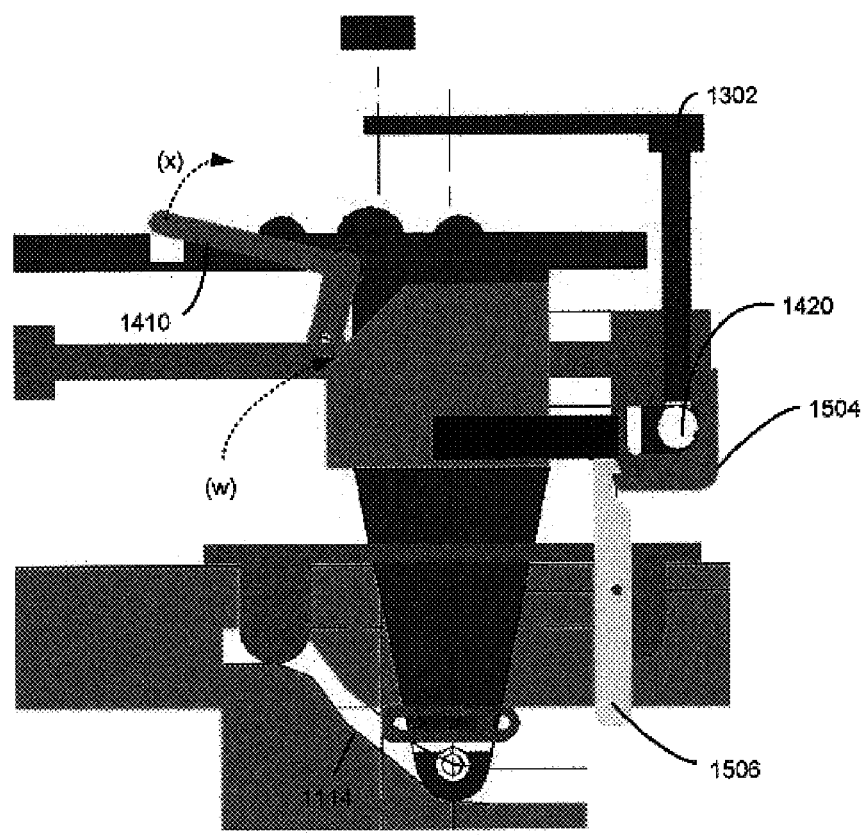

Continuing in FIG. 13D, once the trolley 1120 reaches the bottom of the drop cam 1114, a portion of the trolley 1120 engages the trap bar 1410 in a trap bar assembly 1402 at point (w). Since the trap bar assembly 1402 is pivotally connected to a trap bar cam, the engaging of the trap bar 1410 with the trolley 1120 results in a pivotal rotation of the trap bar 1410 in the direction of the arrow (x). As a result of the pivotal rotation, the trap bar 1410 engages the shackle assembly at point (y) as shown in FIG. 13E.

Figure 13E:
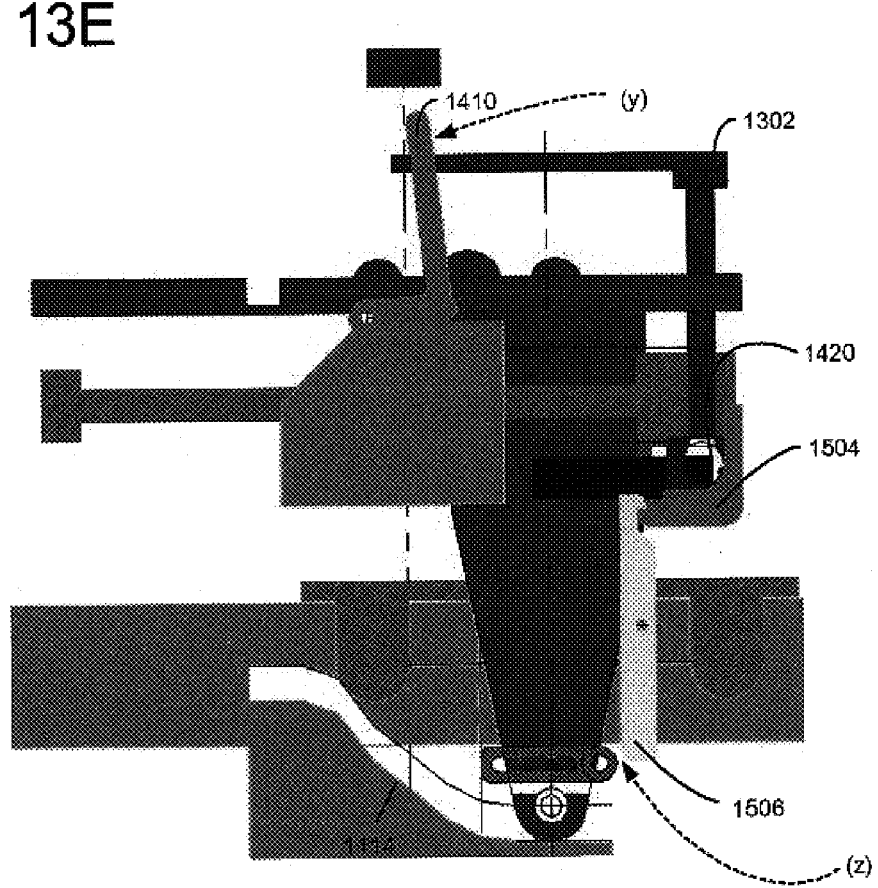

Continuing in FIG. 13E, as the trolley 1120 continues to move forward in the x-direction, the legs of the live object are now secured in the shackle assembly 1302 by the trap bar 1410. The trap bar 1410 is maintained in the secured position by magnetic forces, as described below with reference to FIGS. 14A through 14H. As shown in FIG. 13E, as the trolley 1120 progresses in the x-direction, the trolley 1120 engages the shackle releaser 1506 at point (z). The engaging of the shackle releaser 1506 by the trolley 1120 results in a removal of the previously-existing impediment in the x-direction, thereby releasing the shackle assembly 1302 and the pallet assembly 1204 for further movement in the x-direction. Details related to the releasing of the shackle assembly 1302 are provided with reference to FIG. 15.

As shown from FIGS. 13A through 13E, several mechanical forces are applied to the various components of the shackle assembly 1302, the pallet assembly 1204, and the trap bar assembly 1402, thereby providing a relatively-seamless approach to securing a live object as the live object is being transported along the conveyor 1002. The various points in the process are also highlighted in the graph of FIG. 20. Specifically, FIG. 13B corresponds to time point T1 in FIG. 20; FIG. 13C corresponds to T3 of FIG. 20; FIG. 13D corresponds to T4 of FIG. 20; and FIG. 13E corresponds to T5 of FIG. 20. FIGS. 14A through 19 provide greater details related to the components described above.

Figure 14A:
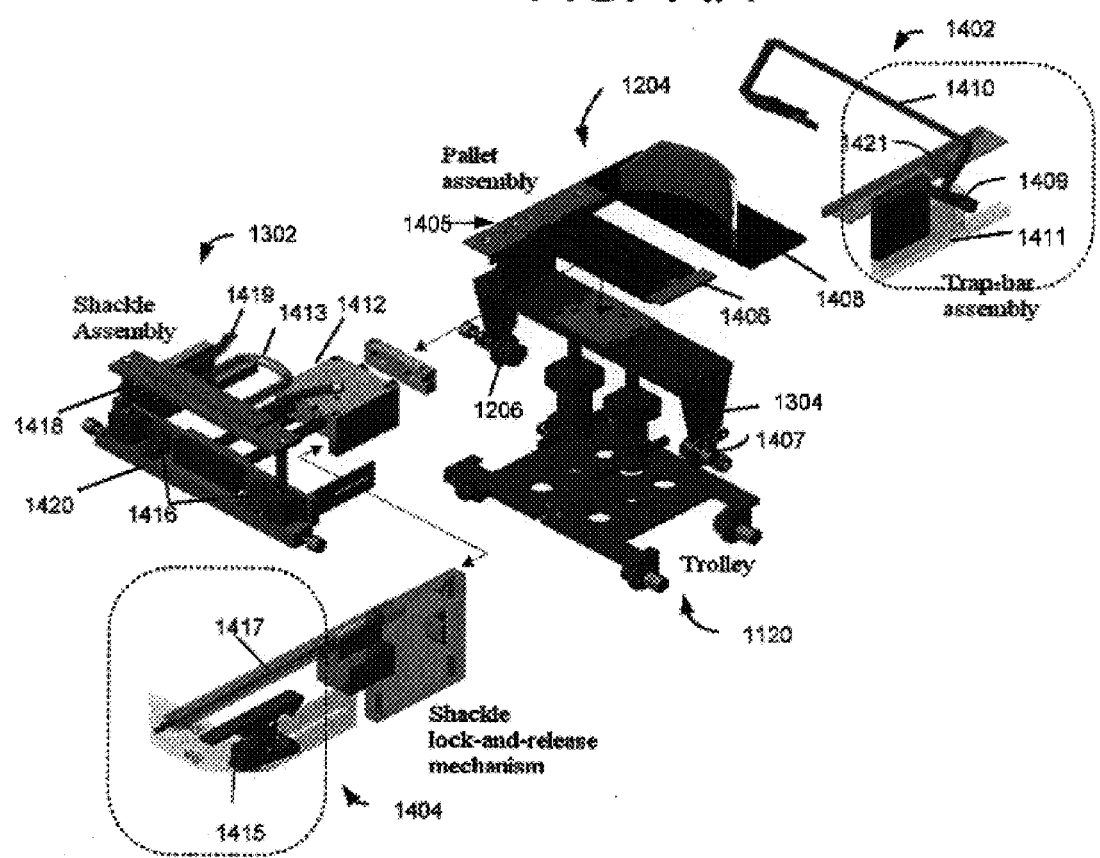
FIGS. 14A through 14H are illustrative examples of schematic diagrams of an automated feet-gripping system in accordance with a preferred embodiment of the invention.

FIG. 14A is an exploded schematic diagram of an automated feet-gripping system in accordance with a preferred embodiment of the invention. In an example, the automated feet-gripping system 1004 includes a pallet assembly 1204, a shackle assembly 1302, a trolley 1120, a trap bar assembly 1402 and a shackle lock and release mechanism 1404.

In a preferred embodiment, the pallet assembly 1204 includes a perch bar assembly 1405 having a perch bar 1406, a release pin for the shackle stopper 1407, a back panel 1408, pallet z-translational guide 1304, rollers 1206. The trap bar assembly 1402 includes a bar 1410 that rotates along a rotating axis, a roller 1409 and cam profile 1411 and a magnetic lock 1421.

In a preferred embodiment, the trap bar assembly 1402 provides for rotating the hocks of the live objects about its toe joints so that the shackle grips the feet below the hocks. Further, the trap bar assembly 1402 locks both feet of the live object in the pair of grippers. Still further, once the live object is inverted, the trap bar assembly 1402 serves as a part of the shackle structure that supports the weight of the inverted live object. The trap bar assembly 1402 has rotational freedom about a rotating axis fixed with respect to the pallet 1208. The rotation of the trap bar assembly 1402 is driven by the trap bar cam profile 1411 acting on a roller 1409 that moves with the shackle assembly 1302 in the x-direction. The bar 1410 can be maintained at a final position by magnetic attraction applied between the trap bar assembly and the pallet assembly 1204.

In a preferred embodiment, the shackle lock and release mechanism 1404 includes a x-motion lock mechanism 1415 and a spring 1417 for quick release of the shackle 1413. In an example, the shackle lock and release mechanism 1404 provides for controlling the shackle motion in the x-direction. Preferably, the x-motion lock mechanism 1415 includes two mechanical levers with a spring and a latch. The rotational axes of the mechanical levers are preferably fixed on the shackle assembly 1302, for example on the trap bar cam profile 1411, such that the x-motion lock mechanism 1415 moves with the shackle 1413 in the x-direction. The quick release spring keeps a space between the shackle 1413 and the pallet 1208 normally open. When the rollers 1206 of the pallet assembly 1204 reach the end of the drop cam profile 1114, the space between the shackle 1413 and the pallet 1208 closes. At that instant, the jaws of the x-motion lock mechanism 1415 snap the latch, which is fixed relative to the pallet 1208. The shackle 1413 and the pallet 1208 remain locked until they reach a point under the conveyor 1002 where the transferring of the live object 100 to a kill-line shackle takes place.

In a preferred embodiment, the shackle assembly 1302 includes a x-motion guide 1412 and z-motion guide rods 1418, and a motion control rod 1420 which can be locked together by means of magnetic attraction. In an example, the x-motion guide provides a base for mounting the trap bar cam profile 1411, magnetic locks 1416, and linear bearings to guide the shackle motion in the z-direction. Preferably, the shackle assembly 1302 includes a compliant shackle 1413 having a pair of feet grippers 1419. In a preferred embodiment, the grippers 1419 are compliant laterally but rigid in the direction perpendicular to the shackle plane in order to support the weight of an inverted live object. The shackle 1413 and grippers 1419 are preferably configured as a rigid rod constructed of for example sheet stainless steel and covered with a material such as synthetic rubber for frictional gripping. The synthetic rubber covering has a high coefficient of friction for gripping and serves as a compliant media to protect and accommodate a relatively wide range of bird feet sizes.

In an example, grippers 1419 and a shackle motion control rod 1420 are movably affixed to the z-motion guide rods 1418. Preferably, the shackle control rod 1420 which is rigidly attached to the compliant shackle 1413, moves with the pallet 1208 in the x-direction. In a preferred embodiment, the z-motion of the shackle control rod 1420 is gravity actuated.

Figure 14B:
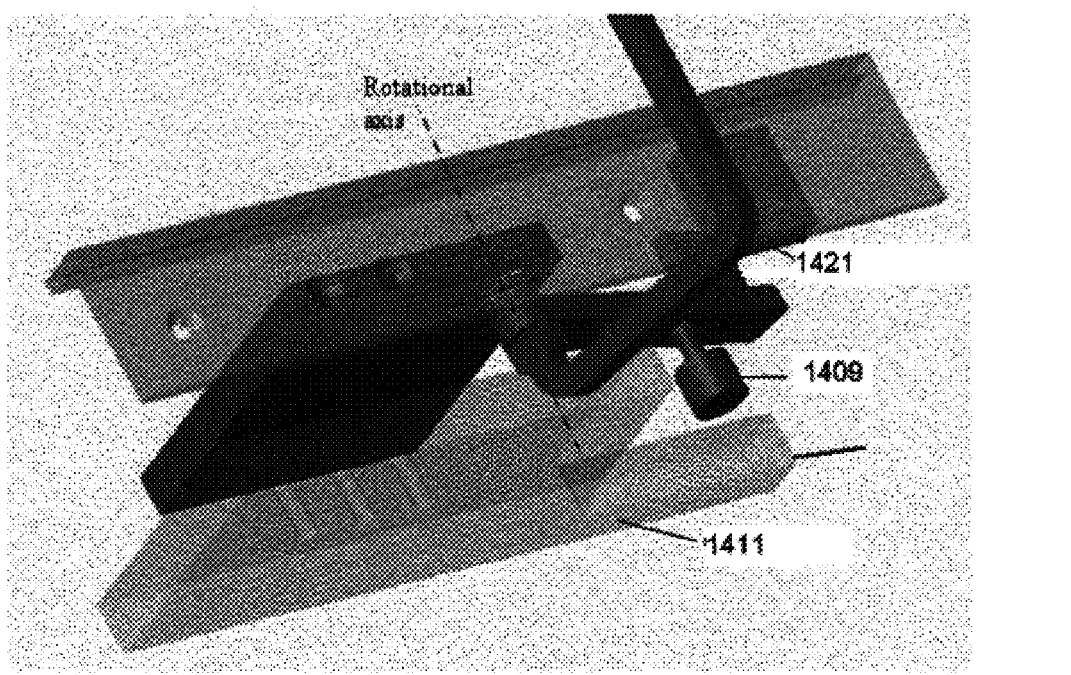

FIG. 14B is an exploded view of the trap bar assembly 1402 of FIG. 14A. As shown in FIG. 14B, the trap bar assembly 1402 includes a trap bar cam 1411, a roller 1409, and a magnetic lock 1421. As described with reference to FIGS. 13A through 13E, the trap bar 1410 pivots about a rotational axis due to contact between the trap bar assembly 1402 and the trolley 1120. Specifically, the trolley 1120 makes contact with the roller 1409 at point (w) of FIG. 13D. The magnetic lock 1421 is responsible for maintaining the locked position ((y) of FIG. 13E) once the trap bar 1410 engages the shackle assembly 1302.

Figure 14C:
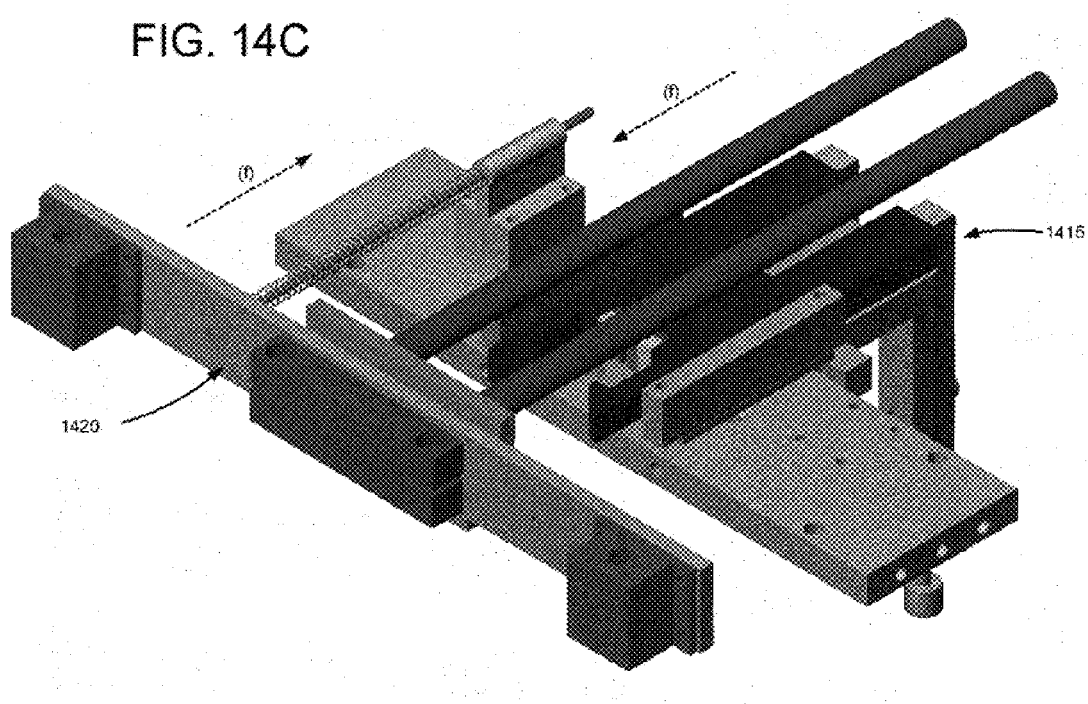

FIGS. 14C through 14H are diagrams illustrating, in greater detail, the shackle locking and release mechanism 1404 of FIG. 14A. As shown in FIG. 14C, the motion control rod 1420 approaches a x-locking mechanism 1415 as shown by arrows (f). As described below, the x-locking mechanism 1415 engages a corresponding set of teeth, thereby providing a secure lock between the x-locking mechanism 1415 and the teeth. FIGS. 14D through 14H show the locking and releasing mechanism in greater detail.

Figure 14D:
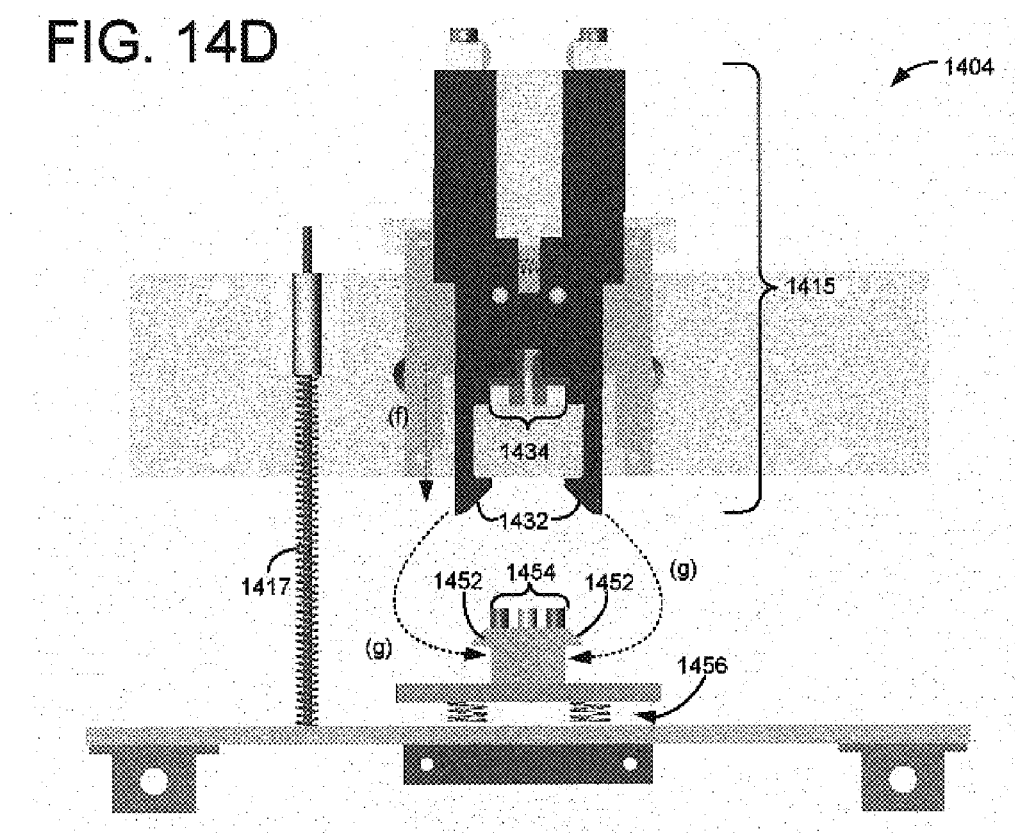

As shown in FIG. 14D, the x-locking mechanism 1415 includes a set of magnets 1434 and a set of clasps 1432. The set of clasps 1432 are configured to open and close, thereby selectively engage or disengage a set of teeth 1452. The set of magnets 1434 are arranged such that the polarity of the magnets opposes a complementary set of magnets 1454 coupled to the teeth 1452. The teeth 1452 are also coupled to a set of springs 1456 located on the motion control rod 1420. The springs 1456 provide compliance in the x-direction, thereby permitting the shackling of live objects having different physical dimensions.

In operation, the x-locking mechanism 1415 travels toward the teeth 1452 on the motion control rod 1420, as shown by the arrow (f). Due to the structure of the clasps 1432 and the teeth 1452, the x-locking mechanism 1415 opens as the clasps 1432 engage the teeth 1452. Once the clasps 1432 have traveled past the teeth 1452, the clasps 1432 close to securely grasp the teeth 1452. The clasps 1432 and the teeth 1452 engage each other as shown by the arrows (g), thereby resulting in an assembly as shown in FIG. 14E.

Figure 14E:
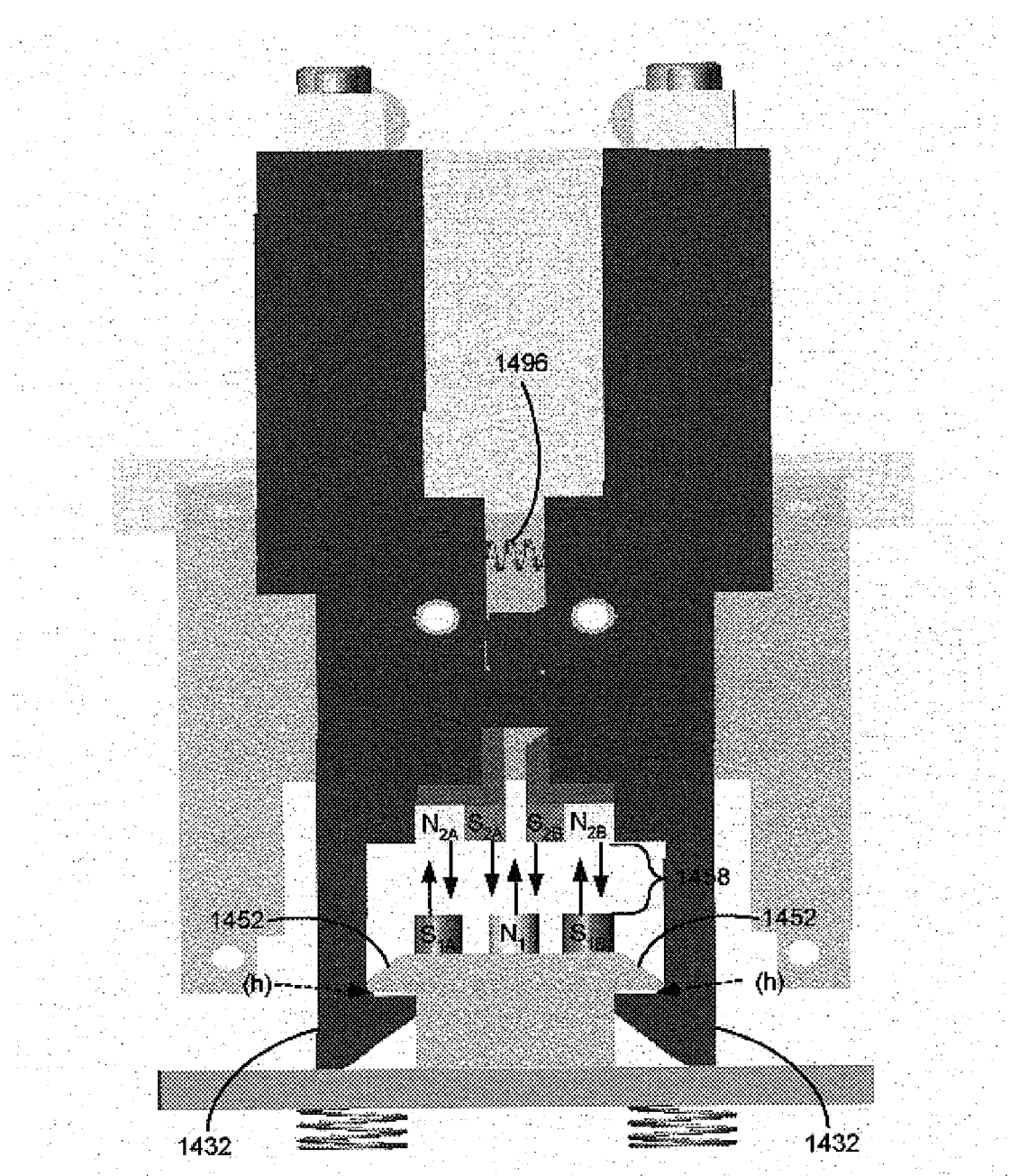

As shown in FIG. 14E, the teeth 1452 and the clasps 1432 are engaged at point (h). The closing of the clasps 1432 is regulated by the force of a spring 1496, which applies a force to the x-locking mechanism 1415 to close the clasps 1432 around the teeth 1452. The engaging of the teeth 1452 with the clasps 1432 brings the magnets 1434 and 1454 in close proximity to each other. The polarities of the magnets are arranged such that, when the clasps 1432 are securely engaged with the teeth 1452, an attractive force 1458 is present between the sets of magnets 1434 and 1454.

Figure 14F:
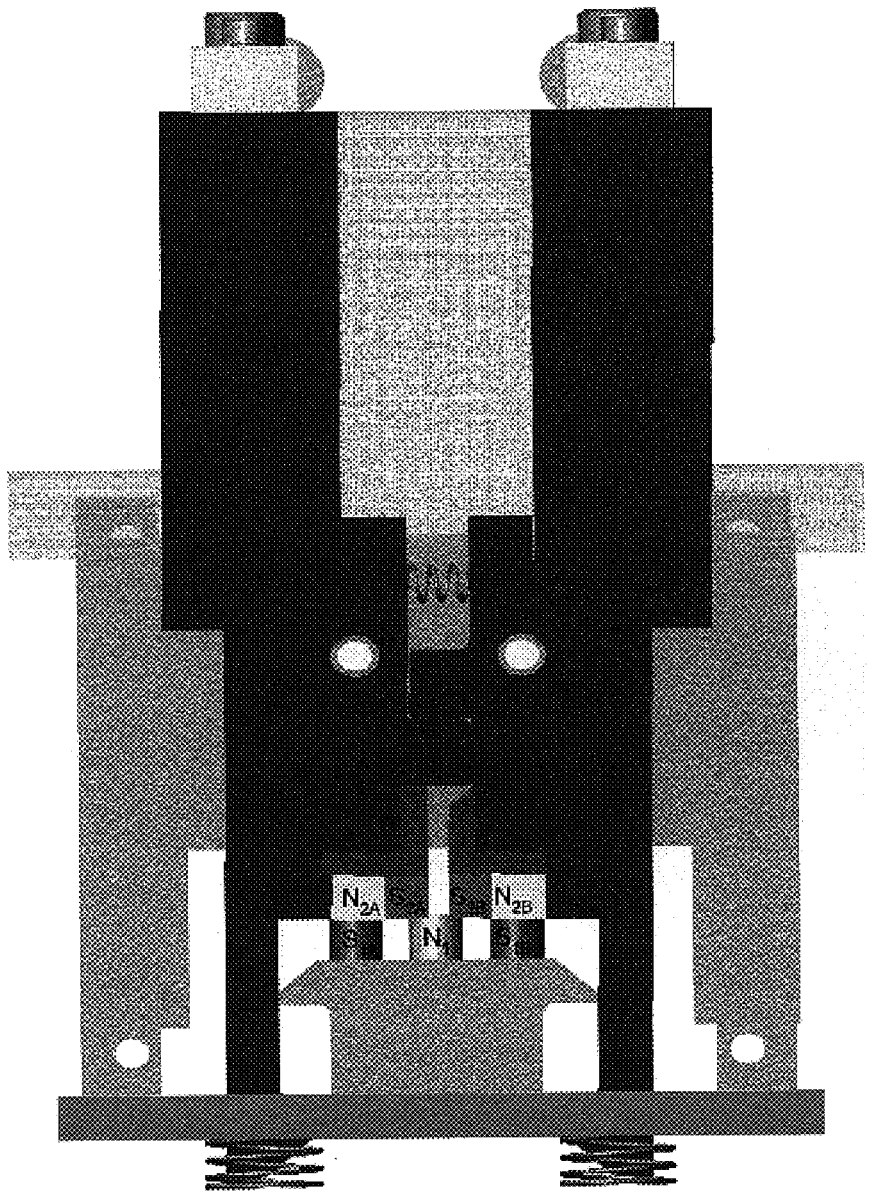

The attractive force 1458 results in further travel of the x-locking mechanism 1415 in the x-direction, as shown in FIG. 14F. Hence, the x-locking mechanism 1415 applies a force on the teeth assembly, thereby compressing the springs 1456. The compression of the springs 1456 and the attraction of the magnets 1434, 1454 results in a compliance in the x-direction, thereby permitting the shackling of live objects having different size legs.

Figure 14G:
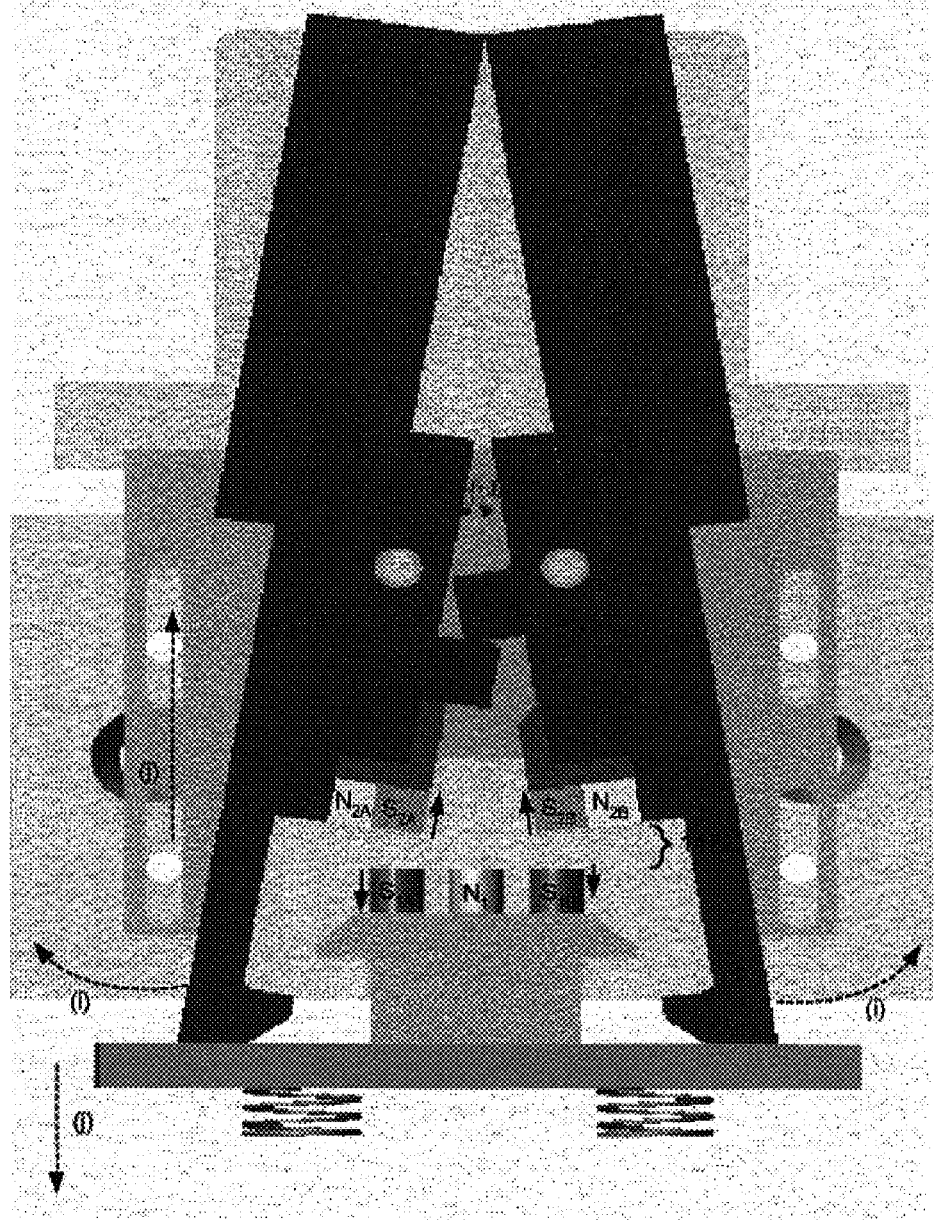
Figure 14H:
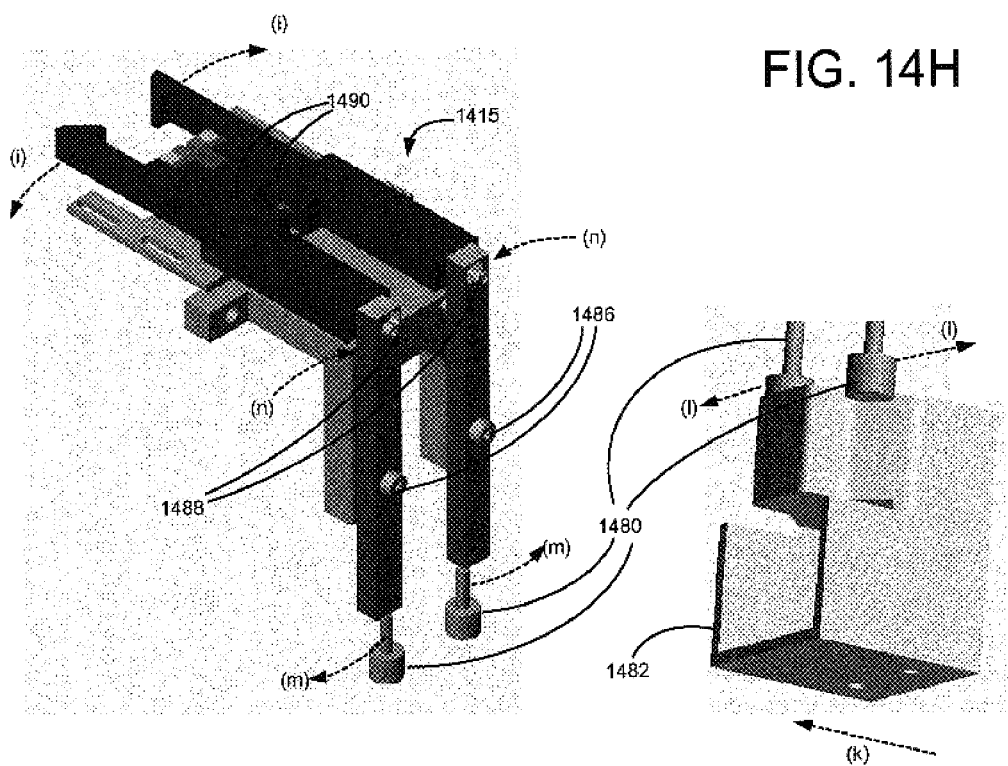

FIGS. 14G and 14H are diagrams illustrating a quick release of the teeth 1452 from the clasps 1432. As shown in FIG. 14G, the x-locking mechanism 1415 is pivotally secured to the shackle lock-and-release assembly 1404. Thus, when one end of the x-locking mechanism 1415 opens, the opposing end of the x-locking mechanism 1415 closes. Similarly, when one end of the x-locking mechanism 1415 closes, the opposing end opens. When the clasps 1432 open according to the arrows (i), the polarities of the magnets 1434, 1454 produce a repulsive force 1472. The repulsive force 1472 results in a quick release of the x-locking mechanism 1415 from the motion control rod 1420, as shown by the arrow (j). In addition to the repulsive force 1472, for some embodiments, a spring mechanism 1417, as shown in FIG. 14D, further assists to disengage the x-locking mechanism 1415 from the motion control rod 1420. Upon release, the live object may be transported by other means not described herein.

Since the timing of the shackling and releasing contributes to the smooth operation of the system 1000, it is desirable to have the release mechanism be quick and reliable. By providing both a magnetic release mechanism and a spring release mechanism, as shown in FIGS. 14A through 14G, a minimal disruption is produced in the system 1000.

FIG. 14H is a diagram showing an embodiment of a system for opening and closing the clasps 1432. As shown in FIG. 14H, some embodiments of the x-locking mechanism 1415 include multiple pivoting legs, which are coupled to each other, thereby effecting a lever movement about several pivot points. A first set of legs (referred to as "upper legs") includes the clasps 1432, which open in the direction shown by arrows (i). The upper legs are secured to upper pivot points 1490, thereby permitting a rotational motion about the pivot points 1490 as the clasps 1432 open and close. The opening of the clasps 1432 according to (i) results in the closing of the legs at the opposing end (n) due to the pivoting motion of the upper legs.

If the upper legs are secured to another set of legs (referred to as "lower legs"), at point (n), then, at the point of contact (n), the movement of the lower legs will mimic the movement of the upper legs. In other words, if the upper legs open at (n), then the lower legs will open at (n). Conversely, if the upper legs close at (n), then the lower legs will close at (n). If the lower legs are secured to pivot points 1486, then the lower legs will pivot in a manner similar to the upper legs. In other words, as the secured end of the lower legs closes as shown by arrows (n), the non-secured end 1480 of the lower legs will open as shown by arrows (m).

As will be appreciated by those of skill in the art, the mechanical coupling 1488 of the upper legs and the lower legs results in a dependent motion of the upper legs and the lower legs. In other words, when the lower legs open and close, the upper legs will open and close in a corresponding manner. Hence, by controlling the opening and closing of the lower legs, one may control the opening and closing of the clasps 1432.

In some embodiments, the opening and closing of the clasps 1432 is effected by a release cam 1482 that is located at position (e) in FIG. 11. The release cam 1482 is configured to open the non-secured portion 1480 of the lower legs, thereby effecting the opening of the clasps 1432. Thus, as the release cam 1482 approaches the shackle lock-and-release assembly 1404, when the release cam 1482 engages the non-secured portion 1480, the release cam 1482 opens the non-secured portion 1480 by applying a lateral mechanical force to the non-secured portion 1480. As the non-secured portion 1480 opens, the clasps 1432 open in a corresponding manner.

As described with reference to FIG. 14G, the opening of the clasps 1432 positions the magnets such that a repulsive force is produced between the magnets. The repulsive force acts to quickly disengage the shackle lock-and-release mechanism 1404, as described above.

Figure 15:
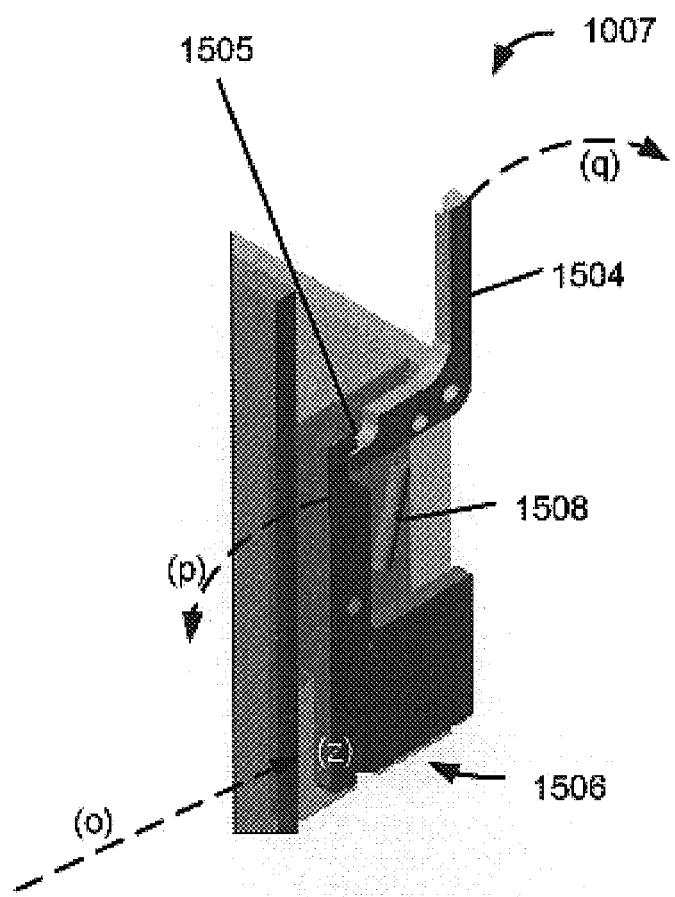
FIG. 15 is a schematic diagram of a shackle control mechanism in accordance with a preferred embodiment of the invention.

FIG. 15 is a schematic diagram of a shackle control mechanism 1007 in accordance with a preferred embodiment of the invention. The shackle control mechanism 1007 includes a shackle stopper 1504 and a shackle releaser 1506. The shackle control mechanism 1007 provides for mechanically controlling the motion of the shackle during the drop cam motion of the pallet assembly 1204 on the conveyor 1002 by interaction among the shackle control rod 1420, shackle stopper 1504, shackle releaser 1506, and the release pin 1407 for the shackle stopper. In an example, the shackle control mechanism 1007 provides a two stage stop or move control action in both x and z-directions. Preferably, the shackle control mechanism 1007 is mounted on a fixed structure such as the conveyor shown in FIG. 10, which limits the motions of the shackle control rod 1420 in both x and z-directions. In an example, the motion limit of the pallet assembly 1204 is removed by the release pin 1407 which moves with the x-motion of the pallet assembly 1204 or trolley 1120.

Specifically, the operation of the shackle-control mechanism begins with both the shackle stopper 1504 and the shackle releaser 1506 engaged at a contact point 1505. The shackle stopper 1504 is maintained in an upright position by a release spring 1508. Hence, in the absence of other forces, the release spring 1508 applies a force to the shackle stopper 1504, thereby preventing the shackle stopper 1504 from pivoting on its own. As described with reference to FIG. 13E, as the trolley 1120 moves in the x-direction shown by arrow (o), the trolley 1120 makes contact with the shackle releaser 1506 at point (z). When the trolley 1120 moves further along (o), the shackle releaser 1506 pivots in the direction shown by arrow (p). The pivoting of the shackle releaser 1506 results in a disengaging of the shackle releaser 1506 from the shackle stopper 1504. Once the shackle releaser 1506 and the shackle stopper 1504 have been disengaged, the shackle stopper 1504 is free to pivot in the direction shown by arrow (q) when a force is applied to the shackle stopper 1504 in the x-direction. The pivoting of the shackle stopper 1504 according to (q) releases the trolley 1120 to travel along the conveyer 1002 to the inversion path 1118.

Figure 16:
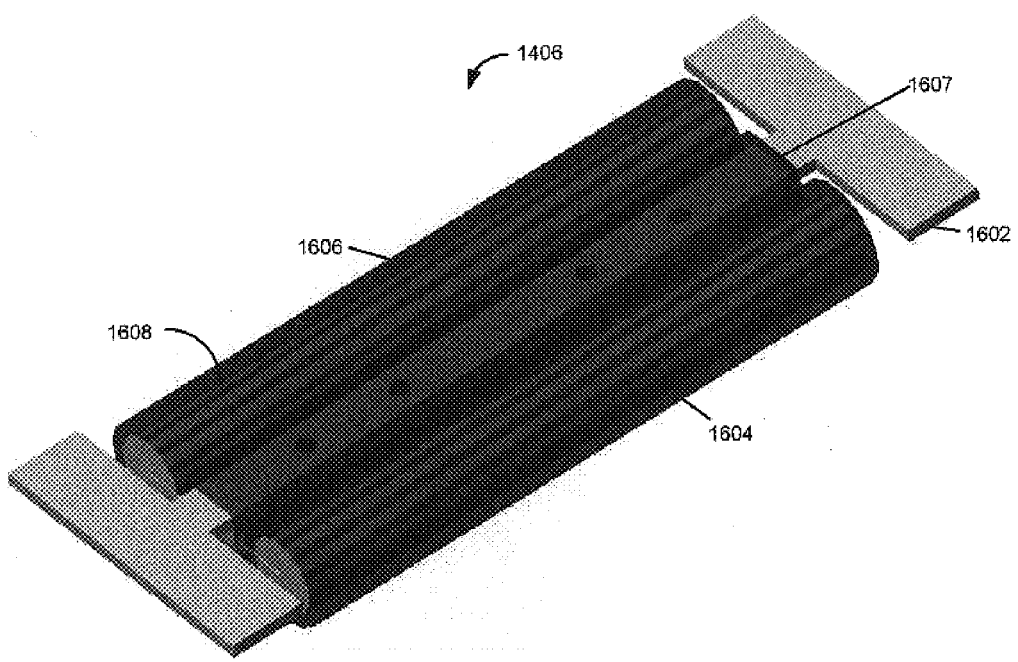
FIG. 16 is a schematic diagram of a perch bar of an automated feet-gripping system in accordance with a preferred embodiment of the invention.

FIG. 16 is a schematic diagram of a perch bar of an automated feet-gripping system in accordance with a preferred embodiment of the invention. In an example, the perch bar 1406 is preferably configured as a rigid rod 1602 that can be constructed from a plurality of materials such as sheet stainless steel. In an example, the rigid rod 1602 is I-shaped on the distal ends, with a center portion 1607 having a length greater than the distal ends. The perch bar 1406 includes cylindrical rods 1604, 1606 movably affixed to the center portion 1607 of the rigid rod 1602. In an example, the cylindrical rods 1604, 1606 include a plurality of grooves 1608. Preferably, the cylindrical rods 1604, 1606 and grooves 1608 are covered with a material such as synthetic rubber for frictional gripping. The synthetic rubber covering has a high coefficient of friction for perching and serves as a compliant media to protect and accommodate a relatively wide range of bird feet sizes. In a preferred embodiment, the center portion 1607 of the rigid rod 1602 is also covered by the synthetic rubber material.

The pliability of the synthetic rubber permits slight movements in the z-direction (superior-inferior axis of the live object). The pliability in the z-direction permits the system 1000 to handle live objects of various sizes. As described above, the compliance in the x-direction, which is provided by the springs 1456 on the motion control rod 1420, in addition to the compliance in the z-direction provide greater flexibility in handling live objects of various sizes. Also, as describe above, the lateral compliance of the grippers 1419 provides even greater flexibility. In other words, by providing compliance in the x-, y-, and z-directions, flexibility is provided to shackle legs of live objects of various sizes.

FIG. 17 is a schematic view of an illustrative embodiment of a grasper system 1006 of an automated feet-gripping system in accordance with a preferred embodiment of the invention. The grasper system 1006 includes a pair of rotating hands 1702. The grasping system 1006 preferably also includes spin control for controlling the rotation of the pair of rotating hands 1702 such that the rotation control includes continuous spin, step spin or stop rotation. Each rotating hand 1702 includes a supporting structure 1704 and a plurality of fingers 1706. The grasping system 1006 is further configured to vary the x-translational speed of the live object 100 while constraining the body in the compliant fingers. In a preferred embodiment, the rotating hands 1702 rotate at the same speed but in opposite directions, which provides for constraining the live object's body while allowing the live object to extend its legs freely. Since the live object tends to keep its feet in contact with the perch bar 1406, this movement provides for both legs of the live object to be located and inserted into the shackle 1413.

Figure 18:
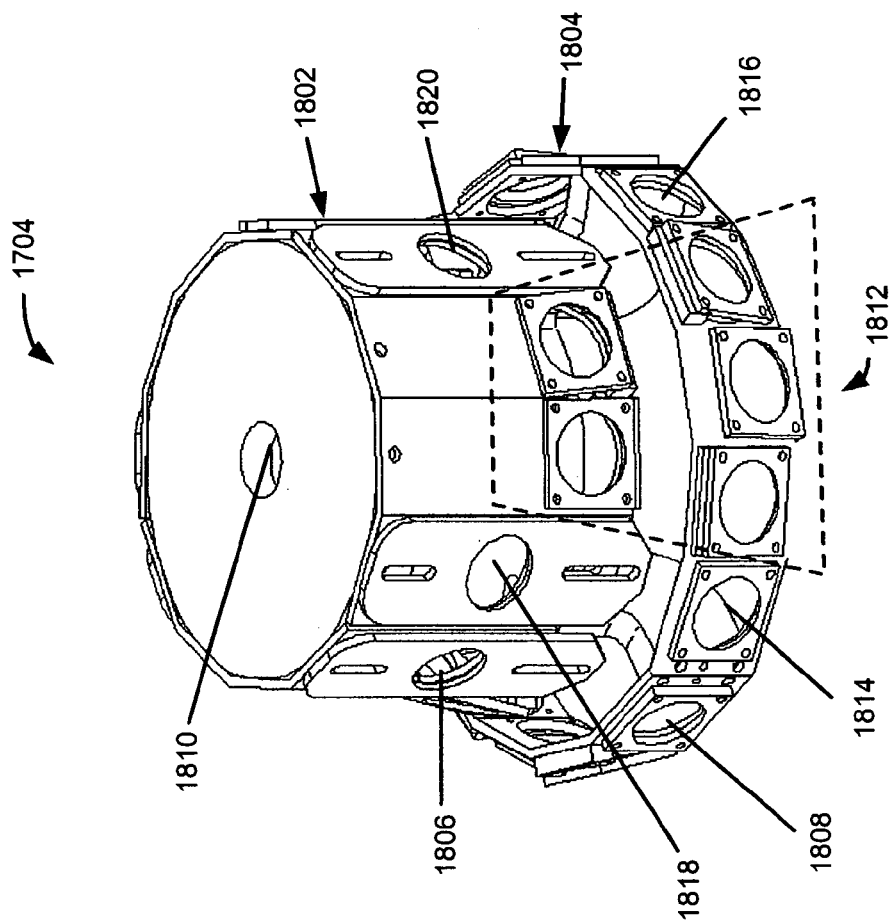
FIG. 18 is a schematic view of an illustrative embodiment of a supporting structure of a grasper system in accordance with a preferred embodiment of the invention.

FIG. 18 is a schematic view of an illustrative embodiment of a supporting structure 1704 of a grasper system 1006 in accordance with a preferred embodiment of the invention. The supporting structure 1704 includes an upper portion 1802, a lower portion 1804, and a plurality of apertures 1806, 1808 disposed in the upper portion 1802 and lower portion 1804. The supporting structure preferably includes an opening 1810 for receiving a device for connecting to the grasper system 1006. In a preferred embodiment, the apertures 1806, 1808 are configured to provide a basic set of five fingers holes 1812, an additional front finger hole 1814, an additional back finger hole 1816, a top front finger hole 1818, and a top back finger hole 1820.

Figure 19:
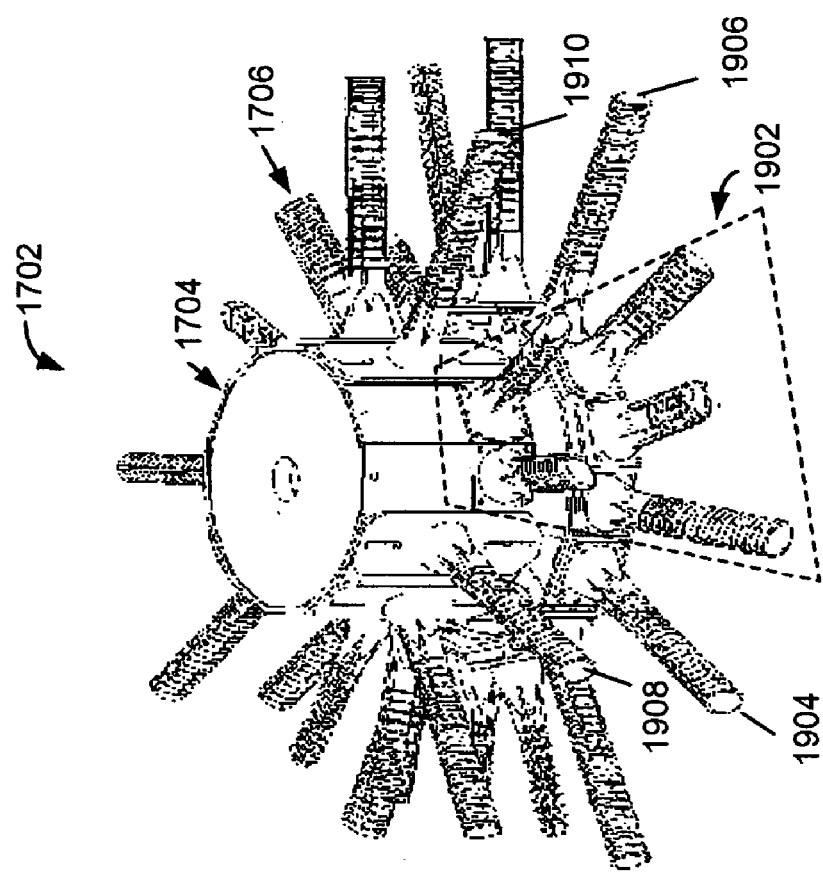
FIG. 19 is a schematic view of an illustrative embodiment of a supporting structure having a plurality of fingers of a grasper system of FIG. 17 in accordance with a preferred embodiment of the invention.

FIG. 19 is a schematic view of an illustrative embodiment of a supporting structure 1704 having a plurality of fingers 1706 of a rotating hand 1702 of FIG. 17 in accordance with a preferred embodiment of the invention. In an example, the set of five finger holes 1812 includes a plurality of compliant fingers 1706 of varying lengths. In an example, the complaint fingers 1706 encompass a structural rigidity between 0.08 Nm$^2$ and 0.35 Nm$^2$. The set of five fingers 1902 preferably encompasses grasping fingers. In an example, the grasper system 1006 is configured to including a plurality of sets of five fingers 1902. The set of five fingers 1902, are preferably organized into two rows in which the lowest row of three fingers supports the weight of the live object and the upper row of two fingers constrain the live object from above. Fingers 1904, 1906, referred to as tolerance fingers, on the lower portion 1804 of the supporting structure 1704 are provided to accommodate a larger range of live objects. Fingers 1908, 1910, referred to as constraining fingers, on the upper portion 1802 of the supporting structure 1704 are provided to fill a space between an adjacent set of fingers to prevent the live object from escaping upward. In an embodiment, fingers on the upper portion 1802 of the supporting structure 1704 angle upward and fingers on the lower portion 1804 of the supporting structure 1704 angle downward.

Figure 20:
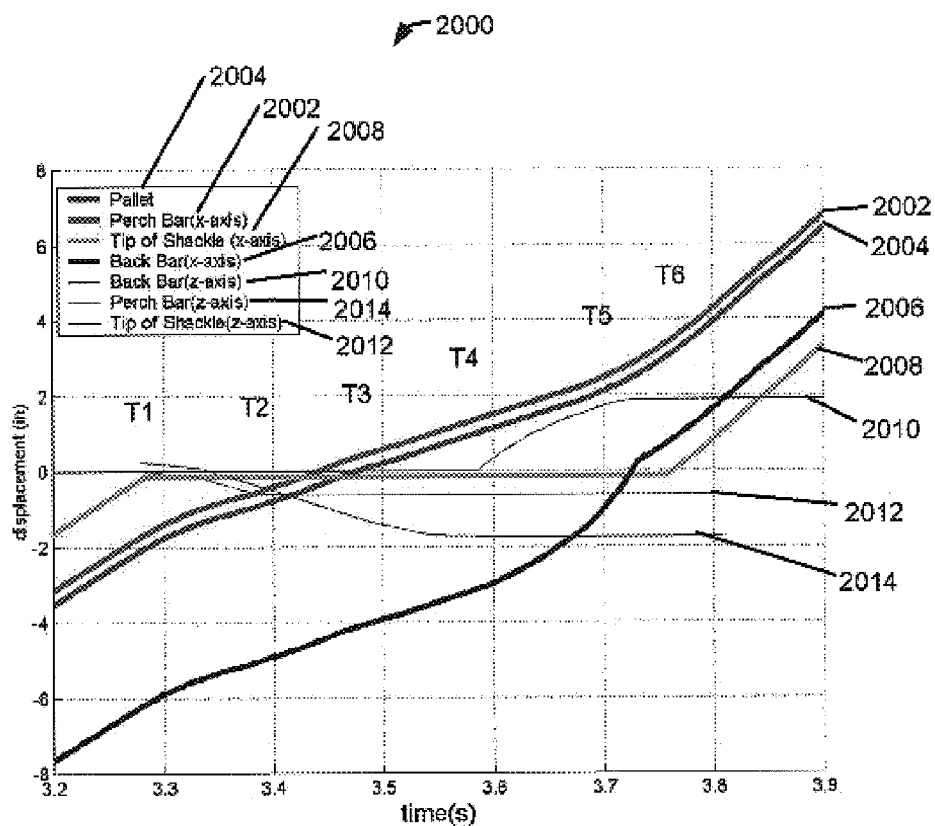
FIG. 20 is a graph illustrating an example of timing control in accordance with a preferred embodiment of the invention.

FIG. 20 is a graph illustrating an example of timing control in accordance with a preferred embodiment of the invention. The graph 2000 illustrates the control sequence that synchronizes the motions of the shackle and pallet with respect to the rotating fingers as a function of time. Line 2002 represents the perch bar 1406 (in reference to a x axis). Line 2004 represents the pallet 1208. Line 2006 represents the trap bar 1410 (or back bar) of the pallet assembly (in reference to the x axis). Line 2008 represents a tip of the shackle 1413 (in reference to the x axis). Line 2010 represents the trap bar 1410 (or back bar) of the pallet assembly (in reference to the z axis). Line 2012 represents the tip of the shackle 1413 (in reference to the z axis). Line 2014 represents the perch bar 1406 (in reference to the z axis).

In an example, when the pallet assembly 1204 arrives at the drop cam 1114, the rotating fingers of the grasper assembly 1006 cradle the live object such that the body translates in a x-direction while the fingers 1706 maintain the body of the live object at a specific height and the feet of the live object follow the perch bar 1406 as it follows the drop cam profile 1114. FIG. 20 illustrates the timing control that synchronizes the motions of the shackle assembly 1302 and the pallet assembly 1204 with respect to the rotating fingers 1706 in a typical cycle. The XYZ coordinate reference frame (as shown in FIGS. 11 and 12) is preferably assigned at the interaction between the plane containing the conveyor drum axes and the plane of the shackle assembly, where the z axis points upwards and the x axis points in the direction of the trolley motion.

At point T1, the rollers for the pallet assembly 1204 are at the beginning of the drop-cam profile 1114. At that instant, the shackle motion control rod 1420 is prevented from moving forward by the shackle stopper 1504 of the shackle control mechanism 1007 but is allowed to lower with the pallet. In an example, the nominal position of the shackle stopper 1504 is held by a counter-clockwise movement offered by an extension spring and a pin fixed with respect to the XYZ frame. To prevent the shackle assembly 1302 from moving forward, the clockwise rotational freedom of the shackle stopper 1504 is rigidly latched by the movement of the counterweight.

At point T2, the pallet motion follows the cam profile 1114, and the shackle 1413 is lowered with the pallet 1208 to a pre-specified height and held stationary by the shackle stopper 1504. At this instant, the z-motion of the shackle is magnetically locked. The space between the shackle 1413 and the perch bar 1406 is designed such that the shackle 1413 barely slides over the feet of the live object to ensure consistent shackling at a specified location on the feet.

At point T3, the rollers 1206 of the pallet continue to move forward and lower as it follows the drop cam profile 1114. Both feet of the live object are driven into the gripping areas of the shackle 1413, which is held stationary.

At point T4, as the rollers 1206 of the pallet move pass the end of the drop cam profile 1114, both feet are gripped in the shackle 1413. The stationary trap-bar cam profile 1411 causes the trap bar 1410 (also referred to as back bar) that moves with the pallet 1208 in the x-direction to rotate the hocks of the live object about its toe joint.

At point T5, the trap bar 1410 rotates the hocks until they are higher than the plane of the shackle 1413 and is then kept at its final position by a pair of magnets that are mounted on the underside of the perch bar. The closing of the trap bar 1410 prevents the live object from retracting one of its legs which is a natural reaction of the live object when it is given time to react. The use of the trap bar provides for the use of short grippers so that the live object can be easily offered from the pallet 1208 to a kill line shackle and provides more consistent shackle of the feet of live objects by lifting the hocks above the shackle 1413.

At point T6, as the shackled live object continues to move with the trolley, the release pins 1407 fixed on the pallet causes the shackle releaser 1506 to rotate counter-clockwise and thus release the shackle stopper 1504. Driven by the motorized chain-conveyor, the momentum of the combined pallet-shackle-live object causes the shackle stopper 1504 to rotate clockwise and free the x-motion of the automated feet-gripping system 1004, which follows the inversion path along which the live object inverts.

Figure 21:
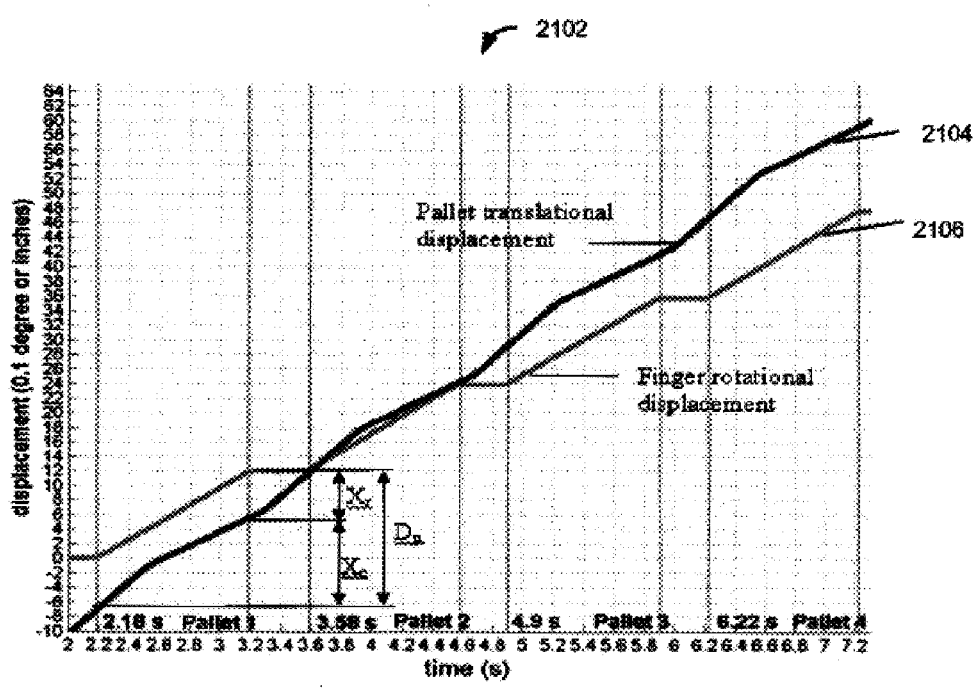
FIG. 21 is a graph illustrating an example of a displacement timing diagram in accordance with a preferred embodiment of the invention.

FIG. 21 is a graph illustrating an example of a displacement timing diagram in accordance with a preferred embodiment of the invention. The graph 2102 shows a timing diagram illustrating the displacements of the rotating hands 1702 and four sequential pallets 1208 for continuous transfer of live objects 100. In an example, line 2104 represents the pallet translation displacement and line 2106 represents finger rotational displacement.

In a preferred embodiment, the rotating hands 1702 rotate at a speed $\omega_a$ for a specified angular displacement, within which the set of fingers 1902 cradle the live object in order to grip both of its feet. The rotating hands 1702 then rotate at speed $\omega_b$ so that another set of fingers are available to cradle a live object that arrives in the next pallet assembly 1204. In order to match the motion of the rotating hands 1702, the pallet assembly 1204 moves at a velocity $v_1$ as the rollers 1206 of the pallet assembly 1204 follow the drop cam profile 1114, and at $v_2$ for the remaining spacing between the two adjacent pallets. For example, $$v_1 \Delta t_1 + v_2 \Delta t_2 = D_\rho$$

$$\omega_a \Delta t_a + \omega_b \Delta t_b = \theta_f$$

where $\Delta t_1 + \Delta t_2 = \Delta t_a + \Delta t_b$;

$D_\rho$ denotes the spacing between two adjacent pallets 1208; and $\theta_f$ is the angular spacing between two adjacent sets of fingers 1902.

In an example where $\theta_f = 120°$, $X_c$ represents the length of an open pallet (see FIG. 12), $D_\rho = 18$ inches and the length of an opened pallet $(X_c) = 12$. When utilizing the above formula and a rotating speed of $\omega_a = 20$ rpm, the preferred pallet assembly velocities are $v_1 = 18$ inches/sec and $v_2 = 10$ inches/sec. For an average speed of a pallet of 12 inches/sec, $\omega_b$ is set to zero for the period equal to 6 inches of distance traveled by the pallet assembly 1204. Thus, the throughput of the system can be set by appropriately adjusting the speed ratio and the spacing $D_\rho$.

In an example, the set of fingers 1902 rotates in synchronization with the movement of the pallet assembly 1204 in a x-direction. A speed control module of the grasper system 1006 is utilized to change the speed and to control the timing of rotating fingers 1902 in relation to the movement of the pallet assembly 1204 thereby controlling the production rate of live objects 100 being shackled and pushed through the fingers to the inverted path 1118 of the conveyor 1002. For example, using a rotating speed $\omega_a = 20$ rpm, approximately 60 live objects 100 per minute can be shackled. By reducing or increasing the rotating speed, the production rate can be appropriately changed. Further, controlling the speed of the rotating fingers 1902 is useful in ensuring that the live objects 100 are supported and constrained by the rotating fingers 1902 so shackling of feet can occur and that the live objects 100 are not rushed through the grasper system 1006 without having their feet shackled. Preferably, a set of fingers 1902 supports and constrains a first live object on a pallet 1208. The live object on the pallet 1208 continues to traverse along the conveyor 1002 to be shackled and then on to the inversion path 1118 of the conveyor 1002. The supporting structure 1704 rotates to position the next set of fingers 1902 for grasping the next live object 100 traveling on the conveyor 1002 as it enters the grasper system 1006. The arrival of the next pallet 1208 is detected by a magnetic sensor 1102. The signal from the magnetic sensor 1102 is used to synchronize the rotation of the fingers 1902 with the movement of the pallet 1208. That live object is shackled and the process continues. In a preferred embodiment, the speed control module controls the timing of the rotation of the fingers 1902 in relation to the speed of the conveyor 1002 such that the rotation of the fingers 1902 moves the live object 100 from the fingers 1902 at a specified rate. In an example, the fingers 1902 can be rotated approximately 100° to grasp a live object 100 and then further rotated approximately 140° to be in position to grasp the next live object 100 on a pallet 1208 awaiting grasping by the fingers 1902.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A device for grasping and supporting a live object, the device comprising:
   a pair of counter rotating supporting structures configured to compel the live object in an x-translational direction at an x-translational speed, each supporting structure including an upper portion and a lower portion, and wherein the upper portion includes a plurality of apertures having a first configuration and the lower portion includes a plurality of apertures having a second configuration;
   a compliant finger disposed within each of the plurality of apertures, the pair of counter rotating supporting structures are further configured to provide an opening for receiving the live object and wherein the compliant fingers are further configured to grasp and hold a body of the live object;

a speed control module for controlling the speed and timing of the rotation of the supporting structures;

a pallet assembly having a perch bar supporting structure, the perch bar supporting structure including perch bars;

a shackle assembly movably affixed to the pallet assembly, the shackle assembly comprising a pair of non-rigid grippers;

a trap bar assembly, the trap bar assembly rotatably affixed to the pallet assembly;

a shackle control mechanism affixed to the shackle assembly, the shackle control mechanism configured to lock and release the shackle assembly from the pallet assembly;

a trolley configured to move in an x-translational direction, the trolley affixed to the pallet assembly; and said pallet assembly comprising a bottom panel, a first side panel hingedly connected to a side of said bottom panel, and a second side panel hingedly connected to a side of said bottom panel at a location opposite to the first side panel.

2. The device of claim 1, wherein each compliant finger further comprises a structural rigidity between approximately 0.08 Nm$^2$ and approximately 0.35 Nm$^2$.

3. The device of claim 1, wherein the lower portion of the supporting structure is further configured to include at least three compliant fingers each disposed in an individual aperture for supporting a body of the live object.

4. The device of claim 3, wherein the upper portion of the supporting structure is further configured to include at least two compliant fingers for constraining the body of the live object from above.

5. The device of claim 4, wherein the three compliant fingers each disposed in an aperture in the lower portion of the supporting structure further comprises a first finger of a first length, a second finger of a second length and a third finger of a third length.

6. The device of claim 5, wherein the two complaint fingers each disposed in an aperture in the upper portion of the supporting structure further comprises a fourth finger of a fourth length and a fifth finger of a fifth length.

7. The device of claim 1, wherein the compliant fingers disposed in the plurality of apertures in the upper portion of the supporting structure incline upward and the compliant fingers disposed in the plurality of apertures in the lower portion of the supporting structure incline downward.

8. The device of claim 1, wherein the compliant fingers comprise a rubber material.

9. The device of claim 1, wherein the speed control module is further configured to synchronize the rotation of the supporting structures with a conveyor transporting the live object.

10. The device of claim 1, wherein the speed control module is further configured to vary the x-translational speed of the live object while constraining the body in the compliant fingers.

11. The device of claim 10, further comprising a conveyor for transporting the live object towards the pair of counter rotating supporting structures, the conveyor further comprises a pallet assembly having a perch bar movably affixed to the conveyor, and wherein the perch bar is configured to receive the live object.

12. The device of claim 11, further comprising a shackle movably affixed to the perch bar, the shackle having a pair of grippers for gripping extended legs of the live object, and wherein when the perch bar declines under the shackle, the set of compliant fingers of the pair of counter rotating supporting structures constrains the live object therein.

13. The device of claim 12, wherein the speed control module controls the timing of the rotation of the supporting structures such that the rotation of the supporting structures is synchronized with the movement of the pallet assembly.

14. The device of claim 12, wherein the speed control module controls the timing of the rotation of the supporting structures in relation to the speed of the conveyor such that the rotation of the supporting structures moves the live object from the compliant fingers of the pair of counter rotating supporting structures at a specified rate.

15. The device of claim 1, wherein the pair of counter rotating supporting structures are further configured to rotate at a same speed.

16. The device of claim 1, wherein the pallet assembly is configured to include rollers for traversing on a conveyor, the pallet assembly further being configured to travel along a separate track of the conveyor from a track of the conveyor utilized by the trolley.

17. The device of claim 16, wherein the conveyor further comprises a drop cam, configured to define a transition in a z-direction, wherein the z-direction comprises a normal vector relative to a conveyor surface.

18. The device of claim 17, wherein the trolley is configured to move along the drop cam in a z-translational direction while continuing to travel in the x-translational direction.

19. The device of claim 17, wherein the shackle control mechanism further comprises a shackle stopper and a shackle releaser, and wherein the shackle stopper and shackle releaser provide for a move or stop control in both an x and z-direction.

20. The device of claim 19, wherein the shackle assembly further comprises a shackle and an x-translational guide, the x-translational guide configured to provide for forward and backward movement of the shackle in the x-translation direction relative to the pallet assembly, and movement of the shackle in the z-direction to stay above the pallet assembly when the trolley of the pallet assembly moves along the drop cam.

21. The device of claim 1, further comprising a back panel affixed to a rear portion of the pallet assembly.

22. The device of claim 1, wherein the trap bar assembly comprises a magnetic lock, a roller and a cam, and the trap bar assembly is configured to rotate along an axis that is fixed with respect to the pallet assembly.

23. The device of claim 1, further comprising a pair of counter rotating supporting structures for receiving a live object deposited onto the pallet assembly, each supporting structure includes an upper portion and a lower portion each having a plurality of apertures disposed therein, and wherein the pair of counter rotating supporting structures are further configured to provide an opening for receiving the live object, and compliant fingers disposed within the apertures of each supporting structure, the compliant fingers are further configured to support and constrain a body of the live object.

24. The device of claim 23, further comprising a speed control module for controlling the speed and timing of the rotation of the supporting structures in relation to movement of the conveyor.

25. The device of claim 1, wherein the perch bars are configured to have a z-direction compliance.

26. The device of claim 1, wherein the grippers are configured to have a y-direction compliance.

27. The device of claim 1, wherein the shackle control mechanism further comprises a shackle stopper and a shackle releaser, and wherein the shackle stopper and shackle releaser provide for a move or stop control in both an x and z-direction.

28. The device of claim 16, wherein the conveyor further comprises an inverter portion that follows an inversion path for inverting the isolated live object shackled in the shackle assembly.

29. The device of claim 16, further comprising a first speed control module configured to control the speed of the conveyor.

30. The device of claim 29, further comprising a second speed control module configured to control the speed and timing of the rotation of a plurality of supporting structures in relation to the speed of the conveyor.

31. The device of claim 1, further comprising a locking mechanism configured to maintain a position of the pair of supporting structures.

32. The device of claim 31, wherein the locking mechanism is further configured to release the body of the live object corresponding to a specific x-translational position.

33. A system comprising:
a pallet assembly having a perch bar supporting structure, the perch bar supporting structure including perch bars;
a shackle assembly movably affixed to the pallet assembly, the shackle assembly comprising a pair of compliant grippers;
a trap bar assembly, the trap bar assembly rotatably affixed to the pallet assembly;
a shackle control mechanism affixed to the shackle assembly, the shackle control mechanism configured to lock and release the shackle assembly from the pallet assembly;
a trolley, affixed to the pallet assembly;
wherein the pallet assembly is configured to include rollers for traversing on a conveyor, the pallet assembly further being configured to travel along a separate track of the conveyor from a track of the conveyor utilized by the trolley;
wherein the conveyor further comprises a drop cam;
wherein the shackle control mechanism further comprises a shackle stopper and a shackle releaser, and wherein the shackle stopper and shackle releaser provide for a move or stop control in both an x and z-direction; and
wherein the shackle assembly further comprises an x-motion guide configured to mount a trap-bar cam profile, magnetic lock and linear bearings that guide the shackle assembly in an x-direction, and z-motion guide rods on which the pair of compliant grippers and a shackle motion control rod are affixed.

34. An automated feet gripping system, comprising:
a pallet assembly for locking and releasing an isolated live object, the pallet assembly including a perch bar for receiving the isolated live object;
a conveyor for transporting the pallet assembly, the conveyor further configured to include a drop cam for lowering the pallet assembly;
a pair of rotating hands having fingers for fully supporting the isolated live object while the pallet assembly is lowered;
a shackle assembly movably affixed to the pallet assembly, the shackle assembly further configured to receive feet of the isolated live object from perch bars when the pallet assembly is lowered and to shackle the feet of the isolated live object in the shackle assembly;
a first speed control module for controlling the speed of a conveyor;
a second speed control module for controlling the speed and timing of the rotation of the pair of rotating hands in relation to speed of the conveyor;
a pair of counter rotating supporting structures configured to compel the live object in an x-translational direction at an x-translational speed, each supporting structure including an upper portion and a lower portion, and wherein the upper portion includes a plurality of apertures having a first configuration and the lower portion includes a plurality of apertures having a second configuration;
a compliant finger disposed within each of the plurality of apertures, the pair of counter rotating supporting structures are further configured to provide an opening for receiving the live object and wherein the compliant fingers are further configured to grasp and hold a body of the live object:
a speed control module for controlling the speed and timing of the rotation of the supporting structures; and
said pallet assembly comprising a bottom panel, a first side panel hingedly connected to a side of said bottom panel, and a second side panel hingedly connected to a side of said bottom panel at a location opposite to the first side panel.

35. The system of claim 34, wherein the conveyor further comprises an inverter portion that follows an inversion path for inverting the isolated live object shackled in the shackle assembly.

36. The system of claim 35, wherein the first speed control module and the second speed control module add claim to speed profile.

* * * * *

UNITED STATES PATENT AND TRADEMARK OFFICE
CERTIFICATE OF CORRECTION

PATENT NO.       : 7,134,956 B2  Page 1 of 1
APPLICATION NO. : 10/618523
DATED            : November 14, 2006
INVENTOR(S)      : Lee It is certified that error appears in the above-identified patent and that said Letters Patent is hereby corrected as shown below:

Column 24, Lines 47-49, delete Claim 36.

Signed and Sealed this

Twelfth Day of June, 2007

JON W. DUDAS
*Director of the United States Patent and Trademark Office*